United States Patent
Rastogi et al.

(10) Patent No.: US 10,867,599 B2
(45) Date of Patent: Dec. 15, 2020

(54) DETERMINING STATE OF AUTOMATED ASSISTANT DIALOG

(71) Applicant: Google LLC, Mountain View, CA (US)

(72) Inventors: Abhinav Rastogi, Santa Clara, CA (US); Larry Paul Heck, Los Altos, CA (US); Dilek Hakkani-Tur, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 120 days.

(21) Appl. No.: 16/321,294

(22) PCT Filed: Oct. 12, 2017

(86) PCT No.: PCT/US2017/056365
§ 371 (c)(1),
(2) Date: Jan. 28, 2019

(87) PCT Pub. No.: WO2019/074509
PCT Pub. Date: Apr. 18, 2019

(65) Prior Publication Data
US 2020/0320988 A1  Oct. 8, 2020

(51) Int. Cl.
*G10L 15/00* (2013.01)
*G10L 15/197* (2013.01)
(Continued)

(52) U.S. Cl.
CPC .............. *G10L 15/197* (2013.01); *G06N 3/08* (2013.01); *G10L 15/16* (2013.01);
(Continued)

(58) Field of Classification Search
None
See application file for complete search history.

(56) References Cited

U.S. PATENT DOCUMENTS 9,607,616 B2 * 3/2017 Watanabe ........... G10L 15/1822
10,049,106 B2 * 8/2018 Goyal .................... G06F 40/35
(Continued)

FOREIGN PATENT DOCUMENTS

WO   2015191412 A1   12/2015

OTHER PUBLICATIONS

Yu, Kai, et al. "Evolvable dialogue state tracking for statistical dialogue management." Frontiers of Computer Science 10.2, Apr. 2016, pp. 201-215. (Year: 2016).*

(Continued)

*Primary Examiner* — Edgar X Guerra-Erazo
(74) *Attorney, Agent, or Firm* — Middleton Reutlinger

(57) ABSTRACT

Determining a dialog state of an electronic dialog that includes an automated assistant and at least one user, and performing action(s) based on the determined dialog state. The dialog state can be represented as one or more slots and, for each of the slots, one or more candidate values for the slot and a corresponding score (e.g., a probability) for each of the candidate values. Candidate values for a slot can be determined based on language processing of user utterance(s) and/or system utterance(s) during the dialog. In generating scores for candidate value(s) of a given slot at a given turn of an electronic dialog, various features are determined based on processing of the user utterance and the system utterance using a memory network. The various generated features can be processed using a scoring model to generate scores for candidate value(s) of the given slot at the given turn.

19 Claims, 8 Drawing Sheets

(51) Int. Cl.
    *G10L 15/30*     (2013.01)
    *G06N 3/08*     (2006.01)
    *G10L 15/22*     (2006.01)
    *G10L 15/18*     (2013.01)
    *G10L 15/16*     (2006.01)
    *G06N 3/04*     (2006.01)

(52) U.S. Cl.
    CPC .......... *G10L 15/1815* (2013.01); *G10L 15/22* (2013.01); *G10L 15/30* (2013.01); *G06N 3/0445* (2013.01); *G10L 15/1822* (2013.01); *G10L 2015/223* (2013.01)

(56) References Cited

U.S. PATENT DOCUMENTS

| | | | | |
|---|---|---|---|---|
| 10,242,667 | B2* | 3/2019 | Sharma | G06F 40/284 |
| 2015/0066496 | A1 | 3/2015 | Deoras et al. | |
| 2015/0127594 | A1* | 5/2015 | Parada San Martin | G06N 3/0454 706/16 |
| 2015/0340033 | A1* | 11/2015 | Di Fabbrizio | G10L 15/1815 704/254 |
| 2016/0104481 | A1* | 4/2016 | Ehsani | G06F 40/211 704/9 |
| 2016/0322050 | A1* | 11/2016 | Wang | G06Q 10/06393 |
| 2017/0091171 | A1* | 3/2017 | Perez | G06F 40/35 |
| 2017/0140755 | A1* | 5/2017 | Andreas | G10L 15/063 |
| 2017/0177715 | A1* | 6/2017 | Chang | G06F 40/186 |
| 2017/0228366 | A1* | 8/2017 | Bui | G06F 40/247 |
| 2017/0270409 | A1* | 9/2017 | Trischler | G06N 3/08 |
| 2017/0287478 | A1* | 10/2017 | Schulz | G10L 15/197 |
| 2018/0121415 | A1* | 5/2018 | Perez | G10L 15/08 |
| 2018/0137854 | A1* | 5/2018 | Perez | G06F 40/35 |
| 2018/0150605 | A1* | 5/2018 | Co | G10L 15/26 |
| 2018/0203848 | A1* | 7/2018 | Perez | G10L 25/30 |

OTHER PUBLICATIONS

Kim, Dongho, et al. "The use of discriminative belief tracking in pomdp-based dialogue systems." 2014 IEEE Spoken Language Technology Workshop (SLT). IEEE, Dec. 2014, pp. 354-359. (Year: 2014).*

European Intellectual Property Office; Communication Pursuant to Article 94(3) EPC issue in Application Ser. No. 17791525.3; 4 pages; dated Apr. 21, 2020.

International Search Report and Written Opinion of PCT Ser. No. PCT/US2017/056365; 16 pages, dated Jul. 6, 2018.

Dernoncourt, F. et al.; Robust Dialog State Tracking for Large Ontologies; pp. 1-12; dated May 7, 2016.

Williams, J. et al.; The Dialog State Tracking Challenge; Microsoft Research, Lenovo Corporation, Nuance Communications and Carnegie Mellon University, US; pp. 404-413; dated Aug. 22, 2013.

Henderson, M.; et al.; The Second Dialog State Tracking Challenge; Department of Engineering and Microsoft Research; 358 Pages; dated Jun. 18, 2014.

Henderson, M.; et al.; The Third Dialog State Tracking Challenge; Department of Engineering, Vocal IQ Ltd and Microsoft Research; 6 Pages; dated Jun. 18, 2014.

Bapna, A., et al.; Towards Zero-Shot Frame Semantic Parsing for Domain Scaling; Google Research; 6 Pages; dated Jul. 7, 2017.

Williams, J.; Web-style Ranking and SLU Combination for Dialog State Tracking; Microsoft Research, pp. 282-291; US; dated Jun. 18, 2014.

Henderson, M. et al.; Word-Based Dialog State Tracking with Recurrent Neural Networks; Department of Engineering and University of Cambridge; pp. 292-299; UK; dated Jun. 18, 2014.

Mesnil, G. et al; Using Recurrent Neural Networks for Slot Filling in Spoken Language Understanding; IEEE/ACM Transactions on Audio, Speech, and Language Processing, vol. 23, No. 3, 10 pages; dated Mar. 2015.

Chen, Y.; End-to-End Memory Networks with Knowledge Carry-over for Multi-Turn Spoken Language Understanding; Interspeech 2016; Sep. 8-12, 2016, San Francisco, USA; 5 pages.

Wen et al.; A Network-based End-to-End Trainable Task-oriented Dialogue System; Cambridge University Engineering Department; 12 Pages; arXiv preprint: 1604.04562; dated Apr. 24, 2017.

Henderson et al.; Deep Neural Network Approach for the Dialog State Tracking Challenge; Proceedings; pp. 467-471; dated Aug. 22, 2013.

Hori, T. et al.; Dialog State Tracking with Attention-Based Sequence-to-Sequence Learning; in Spoken Language Technology Workshop, IEEE; pp. 552-558; dated 2016.

Jaech, A; Domain Adaptation of Recurrent Neural Networks for Natural Language Understanding; Proceedings of Interspeech, dated Aug. 10, 2016.

Shah, P.; et al.; Interactive Reinforcement Learning for Task-Oriented Dialogue Management; NIPS 2016 Deep Learning for Action and Interaction Workshop, 11 Pages; California; dated 2016.

Mrksic, N. et al.; Multi-Domain Dialog State Tracking Using Recurrent Neural Networks; Department of Engineering, University of Cambridge, UK; 6 Pages; dated Jun. 23, 2015.

Hakkani-Tur, D. et al.; Multi-Domain Joint Semantic Frame Parsing Using Bi-Directional RNN-LSTM; Proceedings of Interspeech,; pp. 715-719; USA and Taiwan; dated Sep. 8, 2016.

Williams, J.; Multi-Domain Learning and Generalization in Dialog State Tracking; Proceedings of SIGDIAL, vol. 62; Citesser; pp. 433-441; USA; dated Aug. 22, 2013.

Mrksic, N. et al.; Neural Belief Tracker: Data-Driven Dialogue State Tracking; University of Combridge, Apple Inc.; dated Apr. 21, 2017.

* cited by examiner

DETERMINING STATE OF AUTOMATED ASSISTANT DIALOG

BACKGROUND

An automated assistant (also known as a "personal assistant", "mobile assistant", etc.) may be interacted with by a user via a variety of client devices, such as smart phones, tablet computers, wearable devices, automobile systems, standalone personal assistant devices, and so forth. An automated assistant receives input from the user (e.g., typed and/or spoken natural language input) and responds with responsive content (e.g., visual and/or audible natural language output). An automated assistant interacted with via a client device may be implemented via the client device itself and/or via one or more remote computing devices that are in network communication with the client device (e.g., computing device(s) in "the cloud").

In engaging in a dialog with user(s), an automated assistant tracks the dialog state throughout the dialog. The dialog state represents the automated assistant's estimate of the goal of the user(s) engaged in a dialog with the automated assistant, and can be utilized for various purposes. For example, a current dialog state can be utilized to determine the next utterance (or other content) to be provided by the automated assistant in the dialog. Also, for example, a current dialog state can be utilized to generate an agent command for interacting with one or more agents, such as third-party (3P) agents. For example, some automated assistants can generate an agent command for a 3P agent based on a current dialog state, and transmit the generated agent command to the 3P agent. Responsive content can be generated by the 3P agent in response to the agent command, and utilized to provide responsive output. In some situations, the automated assistant receives the responsive content and provides the responsive content (or a conversion thereof) as the responsive output. In some situations, the 3P agent itself may directly provide the responsive content without utilization of the automated assistant as an intermediary.

In determining a dialog state, some automated assistants seek to determine, based on user and system utterances in a dialog, the most likely value(s) for slot(s) that are instantiated in the dialog. Some techniques utilize a fixed ontology that defines a set of slots and the set of values associated with those slots. However, the set of possible values for some slots can be large or unbounded, making ontological definition of such values burdensome and/or computationally inefficient. Some techniques additionally or alternatively must be tailored to individual slots and/or domains, leading to failure for previously unseen slots and/or domains—or requiring labor intensive and computationally intensive adaptation to each slot and/or domain. For example, some techniques require training a model for each slot type in each domain, which can require computationally burdensome training for each slot and each domain and/or can lead to failure for untrained slots and/or domains. Further, in determining a dialog state, some techniques additionally or alternatively fail to capture long term dependencies between words in user and/or system utterances. Additional and/or alternative drawbacks are presented by various current dialog state determination techniques.

SUMMARY

This specification is directed generally to methods, systems, and computer-readable media for determining a dialog state of an electronic dialog that includes an automated assistant and at least one user—and performing one or more further actions based on the determined dialog state.

In some implementations, the dialog state of an electronic dialog at a given time can be represented as one or more slots and, for each of the one or more slots, one or more candidate value(s) for the slot and a corresponding score (e.g., a probability) for each of the candidate value(s). The score for a candidate value for a slot at a given time of the dialog indicates a likelihood that it is a desired value for the slot, and can be utilized to select the candidate value for use in determining a next system utterance, generating an agent command, and/or in performing other action(s). For example, where higher scores correspond to higher likelihoods, the highest scoring candidate value of a slot at a given time can be selected as a most likely value for the slot and utilized as the "current" value for the slot at the given time. As another example, where higher scores correspond to higher likelihoods, one or more candidate values can be selected and utilized for a slot at a given time based on those candidate values each having a corresponding score that satisfies a threshold (e.g., being greater than a threshold value).

Scores for candidate values can be generated according to techniques described herein. The candidate values for a slot can be determined based on conversational context, which can include language processing of user utterance(s) and/or system utterance(s) (an utterance by the automated assistant) during the dialog, visual information during the dialog, and/or a user's personalized context (e.g., a contacts list and/or location of the user). A slot can optionally also include one or more special values, such as a "null/undefined" value (e.g., that indicates the slot has not yet been instantiated in the dialog) and/or an "indifferent" value (e.g., that indicates the slot has been instantiated, but user utterance(s) indicate no preference for any particular value) for the slot. Scores for such special value(s) of a slot can also be generated according to techniques described herein. One of the special values of a slot can be selected as the most likely value for the slot in some situations (e.g., when its score indicates it is more desired than the scores of candidate value(s) and of the other special value, for the slot).

In some implementations, in generating scores for candidate value(s) of a given slot at a given turn (a system utterance and the following user utterance, or vice versa) of an electronic dialog, various features are determined based at least in part on the system utterance and the user utterance of the turn. In some of those implementations, one or more of the various features are determined based on processing of the user utterance using a memory network and processing of the system utterance using the memory network. A memory network includes one or more memory layers each including a plurality of memory units. A memory unit can be, for example, a long short-term memory ("LSTM") memory unit, a gated recurrent unit ("GRU"), or other memory unit. In many implementations, the memory network can be a bi-directional memory network. Generating features utilizing a memory network can capture long term dependencies in natural language (of user utterances and/or system utterances), which can lead to improved scoring based on the features and, resultantly, to improved dialog state determination relative to techniques that use only a local window around a token that represents a candidate value.

The features determined based on processing of the user and system utterances using a bi-directional memory network can include an utterance representation and candidate value features. The utterance representation can be generated based on a system utterance representation. For example, the utterance representation can be generated based on a system utterance representation that is based on state(s) of the bi-directional memory network after processing of the system utterance. For instance, the system utterance representation can be based on (e.g., a concatenation of) a final forward state and a final backward state of the bi-directional memory network after processing of the system utterance. Also, for instance, the system utterance representation can additionally or alternatively be based on a plurality of hidden states of the bi-directional memory network after processing of the system utterance. The system utterance processed can be, for example, text of the system utterance and/or its machine representation as a system action (e.g., a structured dialog act tag and arguments and values). The utterance representation can further be generated based on a user utterance representation. For example, the utterance representation can further be generated based on a user utterance representation that is based on state(s) of the bi-directional memory network after processing of the user utterance. For instance, the user utterance representation can be a based on (e.g., a concatenation of) a final forward state and a final backward state of the bi-directional memory network after processing of the user utterance. Also, for instance, the user utterance representation can additionally or alternatively be based on a plurality of hidden states of the bi-directional memory network after processing of the user utterance. In some implementations, the utterance representation can be based on a direct sum of the system utterance and the user utterance. As described in more detail herein, the utterance representation is used in scoring all candidate values for the given slot, and can also be used in scoring all candidate values for one or more other slots being tracked for a dialog state.

Candidate value features are each generated for a corresponding candidate value. In some implementations, the candidate value features for a candidate value are used in scoring that candidate value only. In other words, whereas the utterance representation is used in scoring all candidate values for all slots being tracked, in some implementations the candidate value features for a given candidate value are used in scoring only the given candidate value. The candidate value features for a given candidate value can be based on hidden states, of nodes/units of the bi-directional memory network, that correspond to the given candidate value, after processing of a corresponding utterance. A node of the bi-directional memory network corresponds to the given candidate value when the node positionally corresponds to a token of the utterance processed using the network, and the token corresponds to the given value. For example, a user utterance can include the given candidate value. Further, a delexicalized user utterance can be generated by replacing the given candidate value with a slot descriptor of the slot (e.g., a special token, or a textual descriptor that is specific to the slot) for the given value. The delexicalized user utterance can then be processed using the bi-directional memory network. The hidden states of nodes that positionally correspond to the slot descriptor can be the hidden states that correspond to the given candidate value. Candidate value features for a given candidate value can be based on the hidden states of nodes after processing of the user utterance (when the user utterance includes the given candidate value) and/or the hidden states of nodes after processing of the system utterance (when the system utterance includes the given candidate value). The candidate value feature for a given candidate value can also be based on a generated score (if any) for the given value in a previous turn of the dialog (if any). For example, if the given candidate value was present in a previous turn of the dialog, a previous score will have been generated for the given candidate value, and can be utilized in generating the candidate value features for the given candidate value.

Slot features can also be generated. Slot features are each generated for a corresponding slot, and are used in scoring all candidate values for the slot. In other words, whereas the utterance representation is used in scoring all candidate values for all slots being tracked, the slot features for a given slot are used in scoring all candidate values for the given slot (but not for other slots). Also, whereas the candidate value features for a given candidate value are used in scoring only the given candidate value, the slot feature for a given slot are used in scoring all candidate value(s) for the given slot. The slot features for a given slot can be based on whether, for the given turn being considered, the system utterance and/or the user utterance instantiate the given slot. For example, whether the system utterance was based on a system act having the given slot as an argument and whether the user utterance included a value for the given slot. The slot features for the given slot can optionally also be based on a generated score for a null value and a generated score for an indifferent value in a previous turn (if any) of the dialog. The slot features can be generated based on processing of the user utterance and/or system utterance, but optionally without any reference to values generated using the bi-directional memory network.

The various generated features can be utilized in generating scores for candidate value(s) of a given slot at a given turn. For example, in generating a score for each of the candidate values of a given slot, the utterance representation, the slot features for the given slot, and the candidate value features for the candidate value can be utilized. The score for each of the candidate values can be generated using a trained scoring model, such as a trained feedforward neural network model. In some implementations, the scoring model can include one or more candidate value scoring models that are utilized in scoring each of the candidate values. In some of those implementations, the same candidate value scoring model (or replicates thereof) is used in scoring all candidate values for a given slot (and optionally used in scoring all candidate values for all slots). In other words, the same trained parameters can be utilized in scoring multiple candidate values for multiple slots. Moreover, in scoring each of the candidate values at a given turn, the same utterance representation can be applied to the candidate value scoring model for all candidate values for all slots. Additionally, the same slot features can be applied to the candidate value scoring model for all candidate values for a corresponding slot. In this manner, computational efficiency at run time can be improved as separate candidate value scoring models need not be stored and utilized—and/or as the same utterance representations and the same slot features can be utilized in scoring multiple candidate values. Moreover, the candidate value scoring model(s) can be trained based on training instances for multiple slots (optionally across multiple domains)—thereby enabling more robust and/or accurate scoring and/or enabling robust and/or accurate scoring across multiple domains (even when not trained using training instances from one or more of those domains, and/or trained utilizing only limited training instances from one or more of those domains).

In some implementations, in generating a score for each of the candidate values of a given slot, the utterance representation, the slot features for the given slot, and the candidate value features for the candidate value are processed over a candidate value scoring model to generate a corresponding output (e.g., a logit). Moreover, an output (e.g., a logit) can optionally be generated for an "indifferent" value for the given slot based on processing of the utterance representation, and the slot features for the given slot, over a trained indifferent scoring model. The indifferent scoring model can have a different input dimension than the candidate value scoring model(s) (e.g., accept only the utterance representation and the slot features as input, without any candidate value features), and can have different trained parameters than the candidate value scoring model(s). Moreover, an output (e.g., a logit) can optionally be assigned for a "null" value for the given slot based on whether any candidate values have been assigned for the given slot in the dialog. In some implementations, the outputs from the candidate scoring models, the output from the indifferent scoring model, and the output assigned for the null value can be applied to a softmax layer (or other affine layer(s)) to generate scores for the candidate values and the null and indifferent values. The scores can each be a probability for a corresponding value (e.g., normalized probabilities from 0 to 1).

As mentioned above, the scores for the candidate values for the slot(s) can be utilized to determine a dialog state, and to perform one or more further actions based on the dialog state. For example, the scores following a given turn of the dialog can be utilized to determine a dialog state based on the "most likely" candidate value(s) for each of multiple slots, as indicated by the scores for those candidate values. The dialog state can then be utilized to generate a next system utterance, to select an appropriate agent, and/or to transmit a command to an agent. For instance, the next system utterance can be selected using the dialog state and a dialog policy that maps each of a plurality of dialog sates to corresponding system utterances. Also, for instance, an appropriate agent can be selected using the dialog state based on determining that the selected agent can act upon most likely value(s) for slot(s) of the dialog state. Also, for instance, an agent command can be generated based on most likely value(s) for slot(s) of the dialog state (e.g., the agent command can include one or more of those values), and the agent command transmitted to a corresponding agent.

Particular implementations of the subject matter described in this specification can be implemented so as to realize one or more of the following advantages. Dialog state tracking methods and models described in this specification can provide for improved data efficiency compared to other methods. For example, by utilizing the same scoring model for each of multiple slots and/or by using certain generated features (e.g., an utterance representation and/or slot features) in generating a score for each of multiple candidate values (optionally for each of multiple slots) (i.e., the utterance representation), data storage and/or processing requirements can be reduced. Also, for example, the training and/or use of a scoring model as described herein, can enable its usage with a new domain without requiring any training based on training instances that are specific to the new domain (or reducing the amount of such training). This can eliminate computationally expensive training of a new model that is specific to the new domain. Further, training of a scoring model as described herein can be based on training instances for multiple slots and/or for multiple domains. This can increase robustness and/or efficiency of such models. Such increased robustness and/or efficiency of such models, when utilized by an automated assistant for dialog state tracking, can increase the robustness and/or efficiency of dialogs that are engaged in by the automated assistant, thereby resulting in an improved automated assistant. Additionally, various implementations generate a score for a candidate value for a slot without regard to features that are specific to an explicit descriptor of the particular candidate value. For example, various implementations generate a score for a candidate value based on feature(s) that are based on a slot descriptor for a slot of the candidate value, instead of being based on a term or other value that explicitly describes the candidate value. This can enable generation of meaningful scores for all candidate values of a slot, even when that slot has a large (or unbounded) set of possible values. Moreover, some implementations provide an improved features and/or scoring model architecture for dialog state tracking as compared to existing architectures.

Further, implementations of the subject matter described in this specification can be implemented so as to realize more accurate and/or robust tracking of a state of a dialog between user(s) and an automated assistant. This can enable more efficient interactions with the automated assistant, which may conserve various computational resources. For example, it may conserve network and/or processor resources that may otherwise be consumed through interactions with the automated assistant if the state of the dialog was incorrectly determined. For instance, it may reduce the number of "turns" of dialog and/or other interactions that are required between the user and the automated assistant to enable the automated assistant to satisfy an intent of the user.

The summary above is provided as an overview of some features of various implementations disclosed herein. Additional description is provided below of those implementations, and of various additional features and various additional implementations.

In some implementations, a method performed by one or more processors is provided and includes identifying a system utterance of an automated assistant, and a user utterance of a user. The system utterance and the user utterance are provided during a turn of an electronic dialog that includes the user and the automated assistant. The method further includes, determining, based on the system utterance and the user utterance, one or more candidate values for a slot. The method further includes generating: a system utterance representation for the system utterance, and system candidate value features for each of the candidate values for the slot. Generating the system utterance representation and the system candidate value features is based on processing of the system utterance using a bi-directional memory network. The method further includes generating: a user utterance representation for the user utterance, and user candidate value features for each of the candidate values for the slot. Generating the user utterance representation and the user candidate value features is based on processing of the user utterance using the bi-directional memory network. The method further includes generating a score for each of the candidate values for the slot. Generating the score for each of the candidate values is based on processing, using a trained scoring model: the system utterance representation, the user utterance representation, the system candidate value features for the candidate value, and the user candidate value features for the candidate value. The method further includes: selecting a given value, of the candidate values for the slot, based on the scores for the candidate values; and performing a further action based on the selected given value for the slot.

These and other implementations of technology disclosed herein may optionally include one or more of the following features.

In some implementations, determining the candidate values for the slot includes determining the given value based on one or more given terms of the system utterance. In some of those implementations, generating the system utterance representation and the system candidate value features based on processing of the system utterance using the bi-directional memory network includes: generating a delexicalized system utterance that includes the terms of the given utterance, but that replaces the one or more given terms of the system utterance with a slot descriptor for the slot; and processing the delexicalized system utterance using the bi-directional memory network. In some versions of those implementations, generating the system utterance representation includes: generating the system utterance representation based on at least one state of the bi-directional memory network after the processing of the system utterance. For example, generating the system utterance representation based on a final forward state, a final backward state, and/or hidden states of the bi-directional memory network after the processing of the system utterance. In some additional or alternative versions of those implementations, generating the system candidate value features for the given value includes: generating the system candidate value features based on hidden states, of nodes of the bi-directional memory network that correspond to the slot descriptor of the slot, after the processing of the system utterance.

In some implementations, determining the candidate values for the slot includes determining the given value based on one or more given terms of the user utterance. In some of those implementations, generating the user utterance representation and the user candidate value features based on processing of the user utterance using the bi-directional memory network includes: generating a delexicalized user utterance that includes the terms of the user utterance, but that replaces the one or more given terms of the user utterance with a slot descriptor for the slot; and processing the delexicalized user utterance using the bi-directional memory network. In some versions of those implementations, generating the user utterance representation includes: generating the user utterance representation based on at least one state of the bi-directional memory network after the processing of the user utterance, such as a final forward state, a final backward state, and/or hidden states. In some additional and/or alternative version of those implementations, generating the user candidate value features for the given value includes: generating the user candidate value based on hidden states, of nodes of the bi-directional memory network that correspond to the slot descriptor of the slot, after the processing of the user utterance.

In some implementations, the one or more candidate values include the given value and an additional value. In some of those implementations, generating the score for the given value is based on processing, using the trained scoring model: the system utterance representation, the user utterance representation, the system candidate value features for the given value, and the user candidate value features for the given value; and generating the score for the additional value is based on processing, using the trained scoring model: the system utterance representation, the user utterance representation, the system candidate value features for the additional value, and the user candidate value features for the additional value.

In some implementations, the one or more candidate values further include an indifferent value. In some of those implementations, generating the score for the indifferent value is based on the system utterance representation, the user utterance representation, and a score for the indifferent value in an immediately preceding turn of the electronic dialog.

In some implementations, the method further includes: generating an overall utterance representation based on a combination of the system utterance representation and the user utterance representation; and generating overall candidate value features for the given value based on a combination of the system candidate value features for the given value and the user candidate value features for the given value. In some of those implementations, processing, using the trained scoring model: the system utterance representation, the user utterance representation, the system candidate value features for the given value, and the user candidate value features for the given value includes: processing the overall utterance representation and the overall candidate value features using the trained scoring model. In some versions of those implementations, generating the overall candidate value features for the given value is further based on a previous score for the given value, the previous score determined for the given value based on a prior system utterance and a prior user utterance of a prior turn of the electronic dialog, the prior turn immediately preceding the turn of the electronic dialog.

In some implementations, each of the scores is a probability.

In some implementations, the method further includes: identifying an additional system utterance and an additional user utterance of the user, the additional system utterance and the additional user utterance being in a following turn of the electronic dialog, the following turn immediately following the turn of the electronic dialog; determining, based on the additional system utterance and the additional user utterance, one or more additional candidate values for the slot; selecting, based on the scores, a subset of the candidate values for scoring based on the additional system utterance representation and the additional user utterance representation; generating additional scores for: each of the additional candidate values for the slot, and each of the candidate values of the subset, wherein generating the additional scores is based on an additional system utterance representation of the additional system utterance and an additional user utterance representation of the additional user utterance; selecting, based on the scores and from the additional candidate values and the candidate values of the subset, an additional given value for the slot; and performing a yet further action based on the additional given value for the slot.

In some implementations, the method further includes: selecting a domain based on the electronic dialog; and selecting the slot based on it being assigned to the domain.

In some implementations, performing the further action based on the selected given value for the slot includes: generating an agent command that includes the selected given value for the slot; and transmitting the agent command to an agent over one or more networks, wherein the agent command causes the agent to generate responsive content and transmit the responsive content over one or more networks. In some of those implementations, the method further includes: receiving the responsive content generated by the agent; and transmitting, to a client device at which the user utterance was provided, output that is based on the responsive content generated by the agent.

In some implementations, performing the further action based on the selected given value for the slot includes: generating an additional system utterance based on the selected given value; and incorporating the additional system utterance in a following turn of the electronic dialog for presentation to the user, the following turn immediately following the turn in the electronic dialog.

In some implementations, the trained scoring model includes a trained candidate value scoring model that is a neural network model. In some of those implementations, generating the score for the given value includes: applying, as input to the trained candidate value scoring model, input that is based on the system utterance representation, the user utterance representation, the system candidate value features for the candidate value, and the user candidate value features for the candidate value; generating an output based on processing of the input using the trained candidate value scoring model; and generating the score for the given value based on applying the output to an affine layer of the scoring model, along with generated outputs for other of the candidate values of the set.

In addition, some implementations include one or more processors of one or more computing devices, where the one or more processors are operable to execute instructions stored in associated memory, and where the instructions are configured to cause performance one or more methods described herein. The processors may include one or more graphics processing units (GPUs), central processing units (CPUs), and/or tensor processing units (TPUs). Some implementations include one or more non-transitory computer readable storage media storing computer instructions executable by one or more processors to perform one or more methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
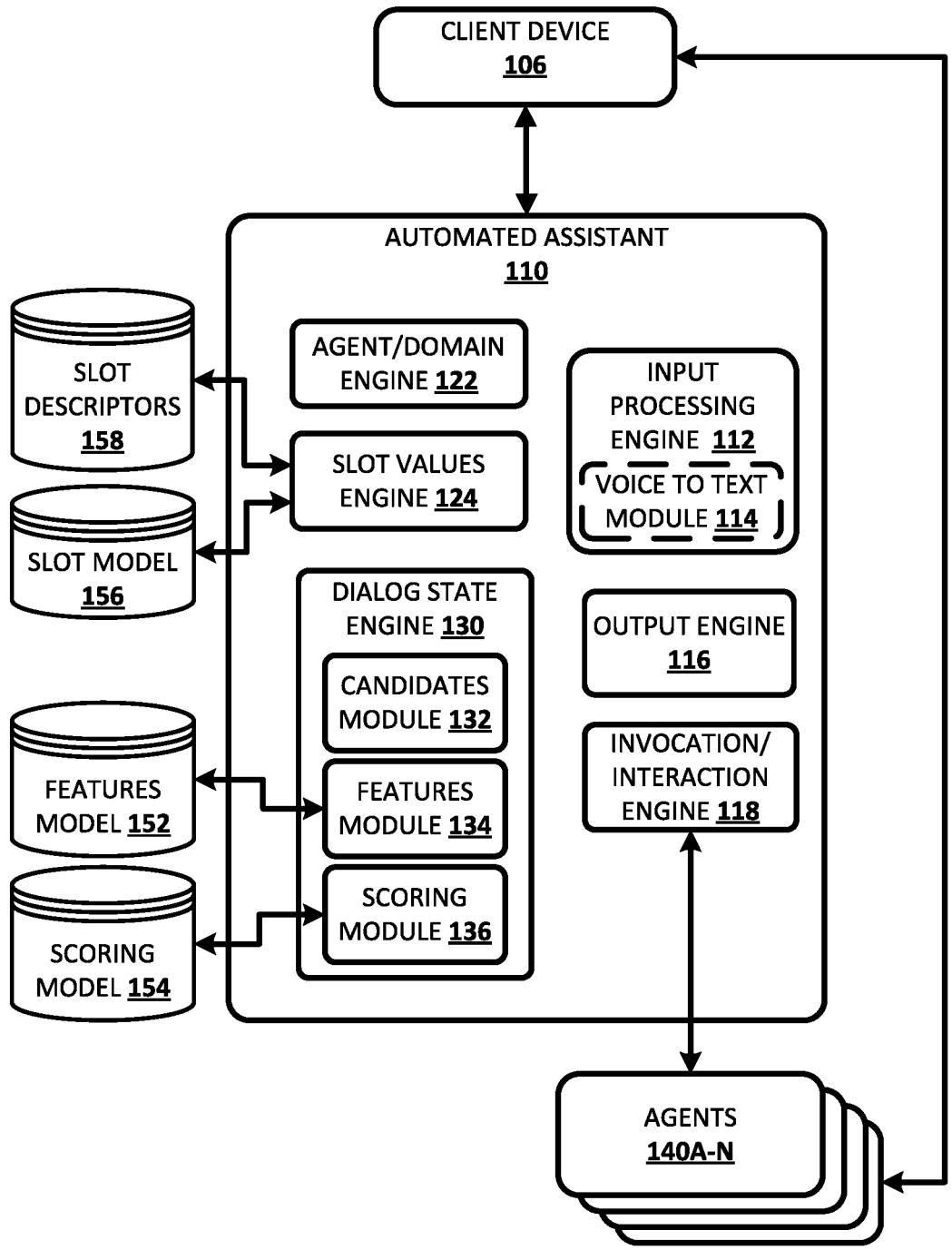
FIG. 1 is a block diagram of an example environment in which implementations disclosed herein may be implemented.

Implementations presented herein set forth deep learning based techniques for dialog state tracking that are capable of handling slots with large or unbounded sets of possible values in scale. During a dialog that involves at least one user and an automated assistant, candidate slot values for slots are determined by a slot values engine. To determine slots and candidate slot values that are present in each user utterance of the dialog, the slot values engine can utilize multi-domain language understanding (LU) models based on bi-directional recurrent neural networks. The multi-domain LU models can be trained based on labeled data and slots across multiple domains, and outputs generated over the multi-domain LU models can be used to delexicalize the user utterances. To determine slots and candidate slot values that are present in each system utterance, the slot values engine can utilize output from a language generation component of the automated assistant. For example, the output from the language generation component can directly indicate the slot(s) and slot value(s) included in a system utterance. External knowledge sources can also optionally be utilized to expand the candidate values for user utterances and/or system utterance. For example, candidate slot values for a spoken user utterance can include a first candidate value that is based on a primary voice-to-text recognition of a portion of the spoken user utterance, and a second candidate value that is based on an alternative voice-to-text recognition of the portion of the spoken user utterance (i.e., to include alternative speech recognition hypotheses in the candidate values).

Throughout the dialog, a dialog state engine maintains a set of candidate values for each of the slots. A set of candidate values for a slot is defined to include candidate values of that slot, along with their associated scores. The score for a candidate value at a given time in the dialog represents the degree of the user's preference for the candidate value in the current dialog at the given time.

As one example, let $C_s^t$ be the set of candidate values at a turn of a dialog at index t for a slot s in a domain D handled by the dialog state engine. At the start of the dialog, $C_s^0$ is empty for every slot. A bound of $|C_s^t| \leq K$ can be imposed to restrict the maximum possible size of the set (i.e., to restrict the quantity of candidate values that are included in a set for a slot). The maximum capacity (K) of each of the sets can be large enough to ensure recently introduced or highly probable candidate values are not flushed out from the set. In some implementations, the maximum capacity (K) can be set to 6, 7, 8, or other value. At each turn (t) of the dialog, all candidate values associated with slot s in the user utterance at turn t can be added to $C_s^t$ (if they are not already present in $C_s^t$). These candidate values are obtained from the slot values engine. For example, the candidate values can be determined by the slot values engine based on applying the user utterance of the turn to an LU model, based on conversation context, and/or based on external resource(s) (e.g., a contacts list of the user). At each turn (t) of the dialog, all candidate values associated with slot s in the system utterance at turn t can also be added to $C_s^t$ (if they are not already present in $C_s^t$). These candidate values are obtained from the system actions at turn t. At each turn (t) of the dialog, all of the candidate values $c_{s,i}^{t-1}$ in $c_s^{t-1}$ can be analyzed in decreasing order of score. $C_s^t$ can be extended with $c_{s,i}^{t-1}$ (e.g., "padding values") if $|C_s^t| < K$. If $|C_s^t| > K$, the lowest scoring candidate values (based on a score from an immediately preceding turn of the dialog) can be flushed from $C_s^t$. These steps ensure that a newly mentioned candidate value is always included in the candidate set and that less preferred values are flushed out if needed.

The dialog state engine then predicts the scores for each of the candidate values for each of the sets by using the score (if any) of the candidate value from an immediately preceding turn of the dialog, and using various features of the user utterance and the system utterance of the dialog turn. The scores for the candidate values for each of the slots can each indicate the probability of the candidate value for the slot. In some implementations, the scores for a slot can be determined based on the candidate values ($V_s$) included in the set for the slot (i.e., candidate values derived from user and/or system utterances), as well as based on "null" (i.e., slot s is not specified yet) and "indifferent" (i.e., user has no preference for slot s) values for the slot. More formally, the scores can be determined based on a distribution over $V'^t_s = C^t_s \cup \{\delta_s, \emptyset_s\}$, where $\delta_s$ represents the indifferent value and $\emptyset_s$ represents the null value. This can be a good approximation since the values which have never been mentioned in the dialog will have their probability close to zero and hence don't need to be explicitly stored in the dialog state. As mentioned above, in order to keep the size of the distribution for a slot constant over all turns, $K-|C^t_s|$ dummy values (i.e., padding) can be added to $V'^t_s$, giving a distribution of size K+2. Furthermore, for most of the slots, $|V'_s|_{=K+}2 \ll |V_s|$. This achieves a compact representation of the distribution and is computationally efficient.

The dialog state engine takes the set of candidate values for each slot as input and updates the score for each candidate value. It also identifies which slots have no constraints (i.e., indifferent value) or have not been specified yet (i.e., null value). As mentioned above, the candidate set is initialized at each turn using the user utterance of the turn, the system utterance of the turn, and the previous candidate set. At time t, the dialog state engine uses the set from the previous dialog turn (denoted as $C^{t-1}_s$) with their scores, and dialog acts and user and system utterances to generate an utterance representation ($r^t_{utt}$), slot features ($r^t_{slot}(s)$), and candidate features ($r^t_{cand}(c^t_{s,i})$). These features are then used by candidate scorers to update the score of a candidate. Let $g^t_s = r^t_{utt} \oplus r^t_{slot}(s), f^t_{c_{s,i}} = g^t_s \oplus r^t_{cand}(c_{s,i}^t$ and $1_{\emptyset_s}^t = 1_{\emptyset_s}$. The scores $p_\alpha^t$ for each $\alpha \in V'^t_s = C^t_s \cup \{\delta_s, \emptyset_s\}$ are updated using the equations: $<l^t_{c_{s,i}} = W^s_2 \cdot \sigma(W^s_1 \cdot f^t_{c_{s,i}} + b^s_1) + b^s_2>$; $<l^t_{\delta_s} = W^s_4 \cdot \sigma(W^s_3 \cdot g^t_s + b^s_3) + b^s_4>$; an $$p^t_\alpha = \frac{\exp(l^t_\alpha)}{\exp(l^t_{\emptyset_s}) + \exp(l^t_{\delta_s}) + \sum_i \exp(l^t_{c_{s,i}})}.$$

$W^s_k$ and $b^s_k$ are trainable model parameters for $1 \leq k \leq 4$.

The features $r^t_{utt}$, $r^t_{slot}$ for (s) and $r^t_{cand}$ ($c^t_{s,i}$) can be obtained using delexicalized user and system utterances of the turn of the dialog. An utterance is delexicalized by substituting all the values associated with the slot s with a special token delex(s) (but without delexicalizing the slot descriptor from the utterance). The delexicalized system utterance and delexicalized system utterance can each be processed using a memory network, such as a two layer stacked bidirectional GRU network. The final forward state $c^t_f$ and backward state $c^t_b$ for the system utterance and the user utterance can be treated as a compact representation of the whole utterance, whereas the states ($h^t_k$ for token at index k formed by concatenating the forward and backward states) encode the context around a token. In addition to the tagging the values of slots, the slot values engine can also predict the speech acts corresponding to the user utterance, e.g., affirm, negate, etc. These speech acts may have an optional slot parameter if a slot can be deduced from the utterance. For example, the utterance "No that doesn't work" corresponds to a negate act, whereas the utterance "6 pm doesn't work for me." corresponds to negate (time). Features are also extracted from the system dialog acts as output by the dialog policy module prior to the user's turn. Some examples of system dialog acts are goodbye, request(time) and inform (time="6 pm"). The delexicalized system utterances are obtained from the language generation component of the dialog system.

An utterance representation ($r^t_{utt}$) is relevant to all candidate values for all slots in the domain and are shared in scoring all candidate values for all slots. The utterance representation can be defined as $r^t_{utt} = c^t \oplus a^t_u \oplus c'^t \oplus a'^t_u$, where $c^t$ is the system utterance representation obtained by concatenating the final forward and backward states of a bidirectional memory network after processing of the system utterance, and $a^t_u$ is binary vector denoting the presence of system dialog acts which don't have any slot or value argument. $c'^t$ and $a'^t_u$ denote the corresponding features for the user utterance.

Slot level features ($r^t_{slot}(s)$) are relevant to a particular slot and are shared in scoring all candidate values for a corresponding slot. The slot level features for a slot s can be defined as $r^t_{slot}(s) = a^t_s(s) \oplus a'^t_s(s) \oplus p_{\delta_s}^{t-1} \oplus p_{\emptyset_s}^{t-1}$, where $p_{\delta_s}^{t-1}$ and $p_{\emptyset_s}^{t-1}$ are the scores of the special values indifferent and null respectively in the previous turn's output and $a^t_s(s)$ is a binary vector denoting the presence of system dialog acts having slot s as the argument (e.g., request(s), deny(s)). $a'^t_s(s)$ is the corresponding binary vector for user dialog acts.

Candidate level features are each relevant to a corresponding particular candidate value and are used in scoring only the particular candidate value. For a candidate value $\hat{c} = c_{s,i}^t$ of a slot s, the candidate level features can be defined as $r^t_{cand}(\hat{c}) = a^t_c(\hat{c}) \oplus a'^t_c(\hat{c}) p_{\hat{c}}^{t-1} \oplus \Sigma_{k \in T} h^t_k \oplus \Sigma_{k \in T'} h'^t_k$, where $a^t_c(\hat{c})$ is a binary vector denoting the presence of all system dialog acts associated to the candidate value $\hat{c}$ (e.g., the act inform corresponds to the candidate with value "cheap" for the slot price in the system intent inform(price="cheap")). $p_{\hat{c}}^{t-1}$ is the predicted score of the candidate value in the previous turn or 0 if $\hat{c}$ was not present in $C^{t-1}_s$. T is the set of indices in the delexicalized system utterance at which the candidate value was present prior to delexicalization. $h^t_k$, $k \in T$, are the hidden state vectors obtained from a bidirectional memory network after processing of the system utterance and encode the context in the system utterance for the candidate value $\hat{c}$. If $\hat{c}$ is not present in the system utterance, T is empty and the result of the summation is taken to be a zero vector of the appropriate size. $a'^t_c(\hat{c})$, T' and $h'^t_k$ are the corresponding values for the user utterance.

Turning now to the figures, these and other implementations are described in more detail.

FIG. 1 illustrates an example environment in which techniques disclosed herein may be implemented. The example environment includes a client device 106, an automated assistant 110, and a plurality of agents 140A-N. The client device 106 may be, for example, a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices may be provided.

Although automated assistant 110 is illustrated in FIG. 1 as separate from the client device 106, in some implementations all or aspects of the automated assistant 110 may be implemented by the client device 106. For example, in some implementations, input processing engine 112 may be implemented by the client device 106. In implementations where one or more (e.g., all) aspects of automated assistant 110 are implemented by one or more computing devices remote from the client device 106, the client device 106 and those aspects of the automated assistant 110 communicate via one or more networks, such as a wide area network (WAN) (e.g., the Internet).

Although only one client device 106 is illustrated in combination with the automated assistant 110, in many implementations the automated assistant 110 may be remote and may interface with each of a plurality of client devices of the same user and/or with each of a plurality of client devices of multiple users. For example, the automated assistant 110 may manage communications with each of the multiple devices via different sessions and may manage multiple sessions in parallel. For instance, the automated assistant 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106.

The automated assistant 110 is separate from the agents 140A-N and communicates with the agents 140A-N via an API and/or via one or more communications channels (e.g., an internal communications channel of client device 106 and/or a network, such as a WAN). In some implementations, one or more of the agents 140A-N are each managed by a respective party that is separate from a party that manages the automated assistant 110. As used herein, an "agent" references one or more computing devices and/or software that are utilized by an automated assistant. In some situations, an agent can be separate from the automated assistant and/or may communicate with the automated assistant over one or more communication channels. In some of those situations, the automated assistant may transmit, from a first network node, data (e.g., an agent command) to a second network node that implements all or aspects of the functionality of the agent. In some situations, an agent may be a third-party (3P) agent, in that it is managed by a party that is separate from a party that manages the automated assistant. In some other situations, an agent may be a first-party (1P) agent, in that it is managed by the same party that manages the automated assistant.

An agent is configured to receive (e.g., over a network and/or via an API) an invocation request and/or other agent commands from the automated assistant 110. In response to receiving an agent command, the agent generates responsive content based on the agent command, and transmits the responsive content for the provision of user interface output that is based on the responsive content. For example, the agent may transmit the responsive content to the automated assistant 110 for provision of output, by the automated assistant 110, that is based on the responsive content. As another example, the agent can itself provide the output. For instance, the user can interact with the automated assistant 110 via the client device 106 (e.g., the automated assistant can be implemented on the client device 106 and/or in network communication with the client device 106), and the agent can be an application installed on the client device 106 or an application executable remote from the client device 106, but "streamable" on the client device 106. When the application is invoked, it can be executed by the client device 106 and/or brought to the forefront by the client device 106 (e.g., its content can take over a display of the client device 106).

The automated assistant 110 includes an input processing engine 112, an agent/domain engine 122, a slot values engine 124, an invocation/interaction engine 118, and an output engine 116. The automated assistant 110 also includes a dialog sate engine 130 that includes a candidate module 132, a features module 134, and a scoring module 136. In some implementations, some of the engines (and/or modules) of automated assistant 110 may be omitted, combined, and/or implemented in a component that is separate from automated assistant 110. Moreover, automated assistant 110 may include additional engines (and/or modules) not illustrated herein for the sake of simplicity.

The automated assistant 110 receives instances of user input from the client device 106. Various types of user input can be provided by a user, via user interface input device(s), to the automated assistant 110. In some instances the input may be a "user utterance" that is free-form natural language input, such as textual input that is based on user interface input generated by the user via one or more user interface input devices (e.g., based on typed input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

As one example, the automated assistant 110 may receive a user utterance in the form of a natural language data stream including a sequence of tokens. For instance, the automated assistant 110 can receive a natural language data stream in response to typed user input or can receive a natural language voice input data stream in the form of a streaming audio recording. The streaming audio recording may be generated by the client device 106 in response to signals received from a microphone of the client device 106 that captures spoken input of a user of the client device 106. In some implementations, user input may be generated by the client device 106 and/or provided to the automated assistant 110 in response to an explicit invocation of the automated assistant 110 by a user of the client device 106. For example, the invocation may be detection by the client device 106 of certain voice input of the user (e.g., an automated assistant 110 hot word/phrase such as "Hey Assistant"), user interaction with a hardware button and/or virtual button (e.g., a tap of a hardware button, a selection of a graphical interface element displayed by the client device 106), and/or other particular user interface input.

The automated assistant 110 provides an instance of output in response to receiving an instance of user input from the client device 106. The instance of output may be, for example, a "system utterance" that includes natural language output. The system utterance can be provided as audio to be audibly presented by the client device 106 (e.g., output via a speaker of the client device 106) and/or as text and/or graphical content to be graphically presented by the client device 106 (e.g., rendered via a display of the client device 106), etc. As described herein, some instances of the output can be system utterances determined based on a dialog policy of the automated assistant 110, and based on the current dialog state. For example, a system utterance at a given time in a dialog can be determined based on the system utterance being mapped to a current dialog state at the given time, as determined by dialog state engine 130. Also, some instances of the output may be based on responsive content generated by a selected one of the agents 140A-N. As also described here, the selected one of the agents 140A-N can be selected based on the current dialog state and/or the responsive content can be generated in response to an agent command that is based on the current dialog state.

The input processing engine 112 of automated assistant 110 processes natural language input (e.g., natural language input received from client device 106), and generates annotated output for use by one or more other components of the automated assistant 110, such as agent/domain engine 122, slot values engine 124, and/or dialog state engine 130. For example, the input processing engine 112 may process natural language free-form input that is generated by a user via one or more user interface input devices of client device 106. The generated annotated output includes tokens that are based on the natural language input and optionally includes one or more annotations of the natural language input. As described above, the natural language input can be based on user interface input generated by the user via one or more user interface input devices (e.g., based on typed input provided via a physical or virtual keyboard or based on spoken input provided via a microphone).

As described herein, token(s) and/or annotations generated by the input processing engine 112 can be utilized, by the slot values engine 124, in determining candidate values for slots. Additionally, the token(s) and/or annotations generated by the input processing engine 112 can be utilized, by the dialog state engine 130 (e.g., by the features module 134) in determining one or more features for use in generating (e.g., by the scoring module 136) scores for the candidate values for the slots.

The input processing engine 112 may optionally standardize or otherwise transform some n-grams in generating tokens. For example, the input processing engine 112 may remove capitalizations, transform dates to a standard format, transform relative temporal terms to a standard format (e.g., transform "tomorrow" to a date that corresponds to "tomorrow"), transform numbers to a generic identifier (e.g., transform any number to "#") etc.

In some implementations, the input processing engine 112 includes a voice to text module 114 that receives an instance of voice input (e.g., in the form of digital audio data), and converts the voice input into text that includes one or more text words or phrases. The converted text can then be utilized by the input processing engine 112 to generate tokens and/or other data. In some implementations, the voice to text module 114 is a streaming voice-to-text engine that uses one or more voice-to-text algorithms to generate text based on voice input. The voice to text module 114 may rely on one or more stored voice to text models (also referred to as language models) that each may model a relationship between an audio signal and phonetic units in a language, along with word sequences in the language. In some implementations, intermediate output(s) of the voice to text module 114 may be utilized as tokens and/or additional annotations of the natural language input that are utilized by one or more components (e.g., applied by the features module 134 to the features model 152). For example, an n-best list and/or lattices generated by the voice to text module 114 may be applied to the features model 152 as a representation of tokens of the natural language input. A lattice is a graph that compactly represents multiple possible hypotheses for an utterance. Accordingly, the lattice represents possible tokens of the natural language input.

In some implementations, the input processing engine 112 is configured to identify and annotate various types of grammatical information in natural language input. For example, the input processing engine 112 may include a part of speech tagger configured to annotate terms with their grammatical roles. For example, the part of speech tagger may tag each term with its part of speech such as "noun," "verb," "adjective," "pronoun," etc. Also, for example, in some implementations the input processing engine 112 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the input processing engine 112 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity to resolve a particular entity. In some implementations, entities resolved for tokens may be utilized as slot values for corresponding slots in addition to, or in lieu of, tokens that are determined to correspond to those slots.

In some implementations, the input processing engine 112 may additionally and/or alternatively include a coreference resolver configured to group, or "cluster," references to the same entity based on one or more contextual cues. For example, the coreference resolver may be utilized to resolve the term "it" in an instance of user input to a preceding mention of "Restaurant A" in an immediately preceding instance of user input. In some of those implementations, the tokens supplied by the input processing engine 112 may include a referent of a pronoun in place of the pronoun itself. For example, "Restaurant A" can be provided as a token instead of "it."

In some implementations, one or more components of the input processing engine 112 may rely on annotations from one or more other components of the input processing engine 112. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the input processing engine 112 may use related prior input and/or other related data outside of the particular natural language input to determine one or more annotations.

The output engine 116 provides instances of output to the client device 106. An instance of output may be a system utterance that is based on a dialog policy of the automated assistant 110, and/or may based on responsive content from one of the agents 140A-N (when the automated assistant 110 acts as an intermediary for that agent). In some implementations, the output engine 116 may include a text to speech engine that converts textual components of responsive content to an audio format, and the output provided by the output engine 116 is in an audio format (e.g., as streaming audio). In some implementations, the responsive content may already be in an audio format. In some implementations, the output engine 116 additionally or alternatively provides textual reply content as output (optionally for conversion by the client device 106 to audio) and/or provides other graphical content as output for graphical display by the client device 106.

The agent/domain engine 122 selects one or more domains and/or one or more of the agents 140A-N that are indicated by a current dialog with the client device 106. As described below, the selected domain and/or agent(s) can be utilized, by the slot values engine 124, to determine slots that are relevant to the domain and/or agent(s). For example a certain set of slots can be relevant for a "restaurant reservation" domain, whereas a different (but potentially partially overlapping) set of slots can be relevant for a "buy movie tickets" domain. Also, for example, a certain set of slots can be relevant for an agent that enables a user to "order food", whereas a different (but potentially overlapping) set of slots can be relevant for an agent that enables a user to "book a flight". As used herein, a domain refers to an ontological categorization of a user's intent for a dialog, and describes the user's intent with less granularity than a dialog state. In some implementations, a corresponding set of slots is defined (e.g., in a database) for each domain. For example, a first set of slots can be defined for a "book bus ticket" domain, a second set of slots can be defined for a "flight booking" domain, a third set of slots can be defined for a "restaurant reservation domain", etc.

The agent/domain engine 122 can select one or more of the domains and/or or one or more of the agents 140A-N based on input provided by the user in the dialog and/or based on other data. For example, the agent/domain engine 122 can select a "book a flight" domain based on an initial user utterance of "Assistant, book me a flight". Other data on which the agent/domain engine 122 can select an agent and/or domain can include, for example: historical interactions of a user of the client device (e.g., which agent(s) has the user utilized in the past for a given domain), overall popularity of the agent and/or the domain, a rating of the agent, currently rendered and/or recently rendered content on the client device, a location of the client device, current date and/or time, etc.

In some implementations, the agent/domain engine 122 selects a particular agent and/or domain based on an explicit invocation of the agent and/or domain by the user in the dialog. For example, some agents may be associated with an explicit invocation phrase, and the agent/domain engine 122 can select a particular agent based on natural language input that includes the invocation phrase for the particular agent. Also, for example, some domains may be associated with a plurality of invocation phrases, and the agent/domain engine 122 can select one of the domains based on natural language input that includes any one of the invocations phrases for the particular domain. The agent selection engine 122 may optionally rely on annotated output from input processing engine 112 in determining a domain. In some situations, where an agent is capable of acting upon multiple domains, the agent selection module 122 may select a particular agent, and a particular domain for the agent.

The slot values engine 124 determines candidate slot value(s) for slot(s) that are assigned to a domain and/or an agent that is indicated in a dialog. For example, for each user utterance and/or system utterance, the slot values engine 124 can analyze the corresponding utterance to determine one or more slot values, for one or more slots of the domain, that are indicated by the utterance. For instance, the slot values engine 124 can determine one or more of the candidate slot values based on tokens of a received user utterance and/or based on tokens of a provided system utterance. In some of those implementations, the slot values engine 124 determines one or more of the candidate slot values further based on slot descriptor(s) for the corresponding slot(s). For example, slot descriptors (or embeddings thereof) can be stored in association with a selected domain and/or agent in slot descriptors database 158. The slot values engine 124 can apply embeddings of the slot descriptors, and tokens of an utterance (or embeddings thereof), to slot model 156 to determine which tokens correspond to which slots. The slot values engine 124 can then assign the tokens, and/or value(s) based on the tokens, as candidate slot values for their corresponding slots.

A descriptor for a slot can be a textual descriptor of the slot, such as a title and/or other descriptor that describes the parameter(s) that can be defined by a slot value for the slot. For example, a "restaurant reservation" domain can include various slots such as a slot with a "number of people" descriptor, another slot with a "restaurant name" descriptor, another slot with a "reservation date" descriptor, another slot with a "cuisine" descriptor, another slot with a "reservation time" descriptor, etc.

The dialog state engine 130 generates scores for the candidate values determined by the slot values engine 124, and optionally generates scores for "indifferent" and/or "undefined" values for slots. As described herein, the scores generated by the dialog state engine 130 indicate the current dialog state. For example, the automated assistant can select, for each of the slots of a domain, one or more candidate values (or indifferent or undefined values) based on the scores. The selected values can then be utilized as the current values for the slots, and thereby define the current dialog state.

The candidates module 132 maintains, for each of the slots of a domain, a set of candidate values for the slot and scores for the candidate values. For example, at the beginning of a dialog, the set of candidate values can be empty (or include only "padding" values). At each dialog turn of the dialog, the slot values engine 124 can provide the candidates module 132 with the candidate values determined for the dialog turn. At each dialog turn, the candidates module 132 can add each newly mentioned candidate value to its corresponding set. In some implementations, the candidates module 132 maintains a fixed number of candidate values in the set for each of the slots. In some of those implementations, the candidates module 132 can add "padding" values to set(s) that don't include enough candidate values. Additionally or alternatively, the candidates module 132 can remove one or more candidate values from a set for a slot to make room for newly provided candidate values for the slot. For example, if the set for a slot is already full and two new candidate values are received, the two existing candidate values of the slot with the worst scores (based on scoring in an immediately preceding dialog turn) can be removed from the set to make room for the two new candidate values.

The features module 134 generates various features at each turn of a dialog. For example, the features module 134 can generate, at each turn of the dialog, an utterance representation, candidate value features, and slot features. The candidate values features are each for a corresponding candidate value in the sets maintained by the candidates module 132. The slot features are each for a corresponding slot of the sets maintained by the candidates module 132. The features module 134 utilizes the features model 152 in generating the utterance representation, and the candidate values features. The features model 152 can be, for example, a bi-directional memory network.

The scoring module 136 generates scores for the values of the candidate set at each turn of the dialog. In generating the scores, the scoring module 136 uses the scoring model 154 and the various features generated by the features module 134. In particular, the scoring module 136 generates the scores based on processing of the various features using the scoring model 154. The scoring model 154 can be, for example, one or more feedforward neural network models trained according to implementations described herein.

Additional description of the dialog state engine 130 is provided below and elsewhere herein.

The invocation/interaction engine 118 performs one or more actions following each turn of a dialog, and performs the one or more actions based on the current state of a dialog. For example, the invocation/interaction engine 118 can determine a system utterance to provide in the next turn of the dialog based on the current state of the dialog. For instance, the invocation/interaction engine 118 can utilize the current state, and a dialog policy, in determining a system utterance to provide in the next turn. As another example, the invocation/interaction engine 118 can generate and transmit an agent command based on the current state of the dialog. For instance, the invocation/interaction engine 118 can generate an agent command that includes slot values, in associated slots, where the slot values are selected based on the current state of the dialog (e.g., the slot values with scores most indicative of being the current slot values). An agent command can be a structured command that includes slot value(s) in associated slots, and optionally additional data such as an indication of a domain (e.g., where the agent operates over multiple domains), a user identifier, a session identifier, etc. In some implementations or situations, the agent command is an invocation command that invokes the selected agent. In some implementations or situations, the agent is already invoked in the dialog (e.g., based on prior natural language input), and the agent command is provided in furtherance of dialog that involves the invoked agent. The selected agent can generate responsive content in response to the agent command. In some implementations, the responsive content is transmitted, by the selected agent to the automated assistant 110, and the output engine 116 generates output based on the responsive content. For example, the output engine 116 can provide the responsive content, unaltered, as output—or can perform a text to speech conversion (or other conversion) of the responsive content, and provide the converted content as output. In some implementations, the responsive content is transmitted, by the selected agent, directly to the client device 106. In yet other implementations, the selected agent may operate locally on the client device 106 (e.g., be an application installed on the client device 106), and can generate the responsive content for direct display on the client device 106.

Each of the agents 140A-N may include its own content engine, and/or other engines. Moreover, in many implementations an agent may access various stored models and/or other resources (e.g., its own grammar model(s) and/or content model(s)) in generating responsive content.

Figure 2A:
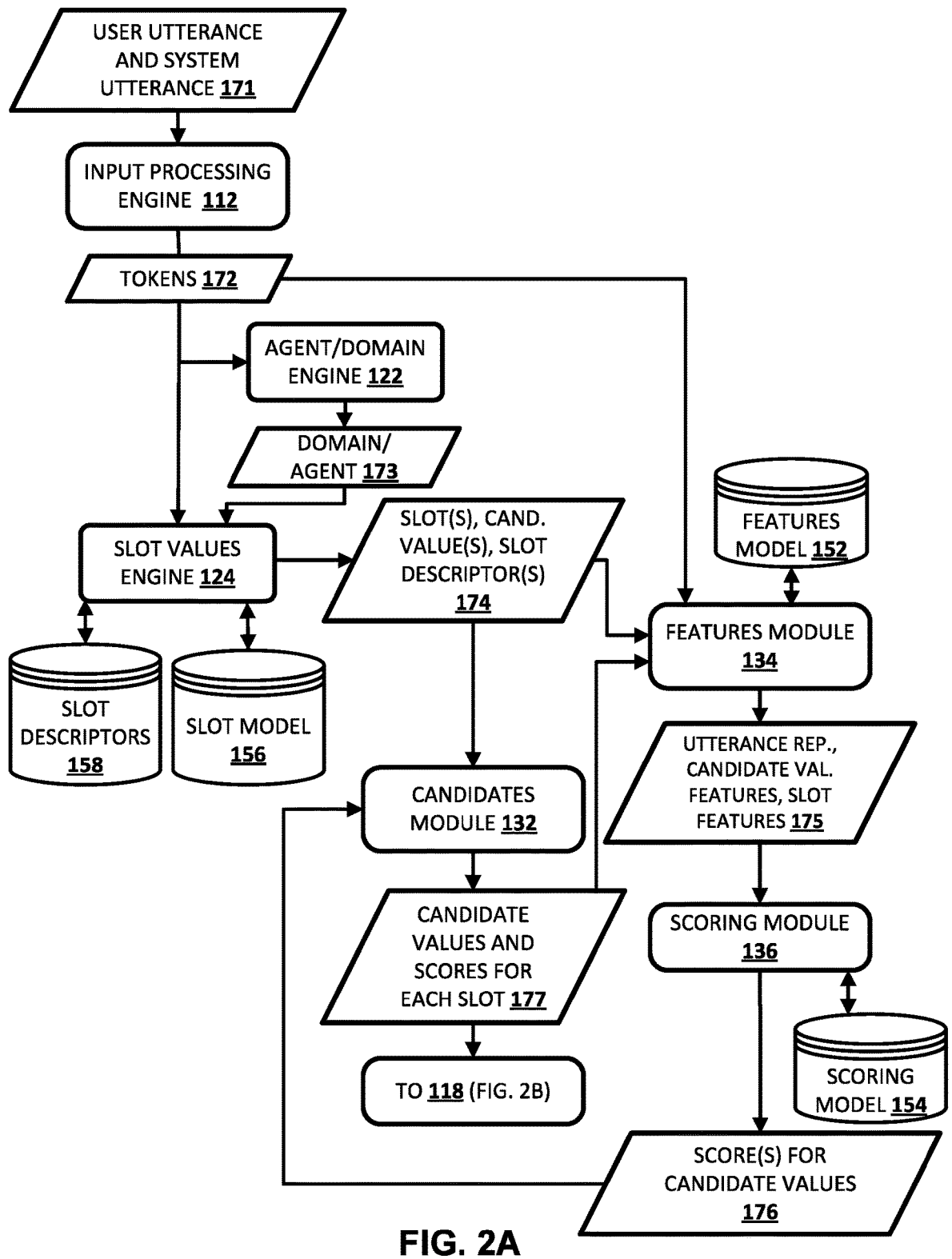
FIGS. 2A and 2B illustrate an example of how various components of FIG. 1 may interact in some implementations.
Figure 2B:
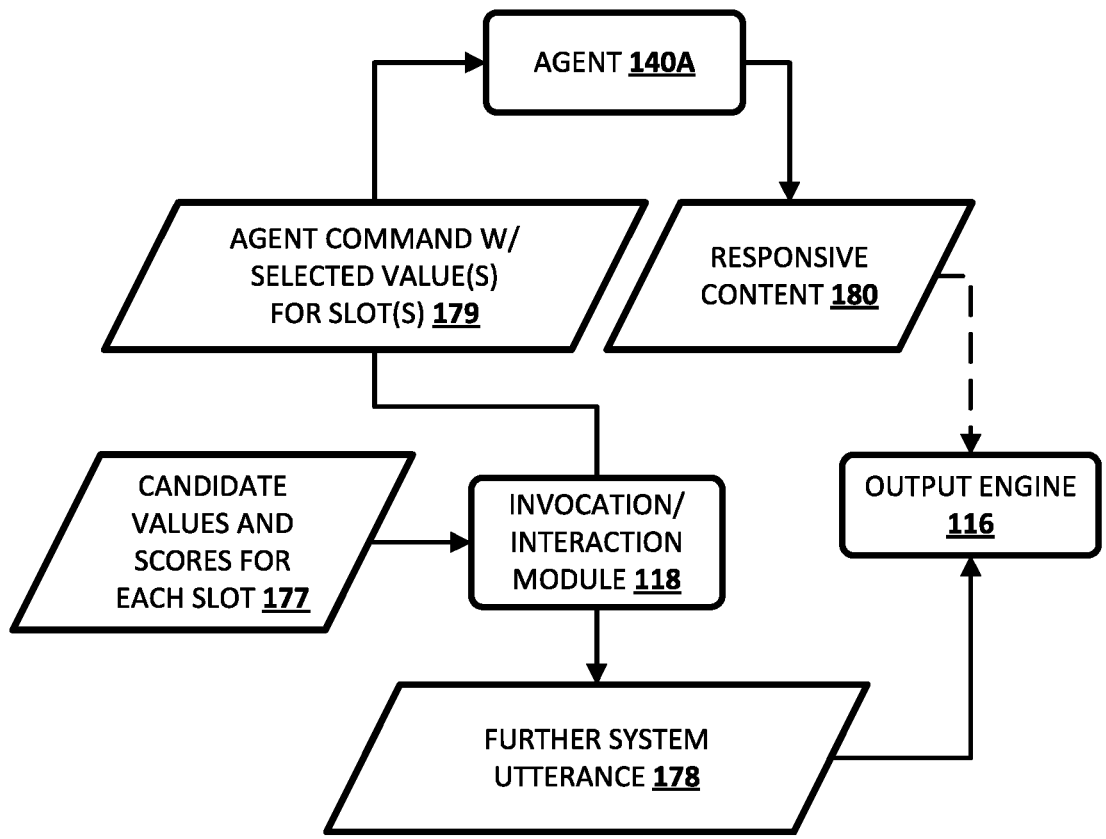

Referring to FIGS. 2A and 2B, an example is illustrated of various components of FIG. 1 and how they may interact in some implementations. In FIG. 2, a user utterance and a system utterance 171 is received by the input processing engine 112 of the automated assistant 110. For example, a system utterance and a responsive user utterance of a turn of a dialog can be received.

As a working example, the user utterance and the system utterance 171 can include a system utterance of "There are tables available at 6 pm at Cascal. Does that work?", followed by the user utterance of "6 pm doesn't work for me. How about 7 pm?". In the working example, the system utterance and the user utterance 171 can be preceded by a prior turn of the dialog that included a user utterance of "book Cascal table today". The input processing engine 112 generates tokens 172 based on the user utterance and the system utterance 171 and provides the tokens 172 to the slot values engine 124, the features module 134, and optionally the agent/domain engine 122. In some implementations, the input processing engine 112 additionally provides additional annotations of the user utterance and the system utterance 171 to the engine 122, the module 134, and/or the engine 124.

In some implementations and/or at some turns of the dialog, the agent/domain engine 122 utilizes the tokens 172 and/or other data to select a particular domain and/or agent, and provides an indication 173 of the domain and/or agent to slot values engine 124, and optionally to invocation/interaction module 118 (FIG. 2B). Continuing with the working example, the agent/domain engine 122 may select a "restaurant reservation" domain based on the prior user utterance of "book Cascal table tonight" (e.g., based on presence of "restaurant reservation" domain terms such as "book" and "table").

The agent/domain engine 122 provides the indication 173 of the domain and/or the agent to the slot values engine 124. The slot values engine 124 accesses slot descriptors database 158 to identify slots that are assigned to the domain and/or agent indicated by the indication 173, and to identify slot descriptors for those slots.

The slot values engine 124 utilizes the tokens 172, and optionally embeddings for the slot descriptors, to determine which tokens 172 correspond to which identified slot(s) (if any). For example, the slot values engine 124 can apply the tokens 172 and the embedding(s) for slot descriptor(s) as input to the slot model 156 and generate, over the slot model 156 based on the input, output(s) that indicate which tokens 172 correspond to which slot(s) (if any). The slot values engine 124 can utilize the output(s) to determine which tokens 172 correspond to which slot(s).

The slot values engine 124 further generates candidate value(s) for one or more slot(s) of the domain based on the corresponding determined tokens. For example, the candidate value(s) can correspond strictly to the tokens, or can be entity identifiers or other indications of the tokens. Continuing with the working example, the slot values engine 124 can determine, based on one or more passes over slot model 156, that: "Cascal" is a candidate slot value for a slot with a "restaurant name" descriptor, and that "6 pm" and "7 pm" are candidate slot values for a slot with a "time" descriptor.

The slot values engine 124 provides the slots, the candidate values, and the slot descriptors 174 to the candidates module 132 and to the features module 134 of the dialog state engine 130.

The candidates module 132 adds any "new" candidate values for each slot to a set of candidate values for the slot. Continuing with the working example, "Cascal" is already a candidate value for the "restaurant name" slot based on its mention in the prior user utterance of "Book Cascal Table tonight". Accordingly, "Cascal" will not be added to the "restaurant name" candidate values since it is already included in the set of candidate values for the "restaurant name" slot. However, "6 pm" and "7 pm" can both be added to the set of values for the "time" slot since they are not already present in the set, and they were included in the dialog turn. In some implementations, the candidates module 132 maintains a fixed number of candidate values in the set of values for each of the slots. In some of those implementations, the candidates module 132 can add "padding" values to set(s) that don't include enough candidate values. Additionally or alternatively, the candidates module 132 can remove one or more candidate values from a set for a slot to make room for newly provided candidate values for the slot.

The features module 134 utilizes the tokens 172, and the slots, slot values, and slot descriptors 174 to generate an utterance representation, candidate value features, and slot features 175. As described herein, the utterance representation and the candidate value features can be generated utilizing the features model 152. As also described herein, the candidate value features can be generated for each of the candidate values determined based on the user utterance and/or system utterance 171, and for any additional candidate values maintained in the set by candidates module 132. Further, the candidate value features can be generated utilizing scores for the candidate values, where the scores are from scoring of an immediately preceding dialog turn. The candidate values from prior dialog turns, and the scores from the immediately preceding dialog turn can be provided by the candidates module 132, which maintains the sets of candidate values for the slots, and their scores. An example of determining various features using an embodiment 152A of the features model 152 is described in more detail below with reference to FIG. 3.

The features module 134 provides the utterance representation, candidate value features, and slot features 175 to the scoring module 136. The scoring module 136 utilizes the scoring model 154, and the utterance representation, candidate value features, and slot features 175, to generate scores for the candidate values of all of the sets. Continuing with the working example, a score can be generated for the candidate value "6 pm" for the "reservation time" slot, and a score generated for the candidate value "7 pm" for the "reservation time" slot. Further, a score can be generated for the candidate value "Cascal" for the "restaurant name" slot. Scores can also be generated for null and indifferent values for the "reservation time" slot, and for null and indifferent values for the "restaurant name" slot. An example of generating scores for a plurality of candidate values of a slot, and for null and indifferent values for the slot, is described in more detail below with reference to FIG. 4.

The scoring module 136 provides the scores for the candidate values to the candidates module 132. The candidates module 132 updates its maintained listing of sets of candidate values and scores to reflect the most recent scores. The candidates module 132 provides the candidate values and the most recent scores for each slot 177 to invocation/interaction module 118.

In some implementations or situations, the invocation/interaction module 118 determines a further system utterance 178 based on the candidate values and the scores for each slot 177. The further system utterance 178 can be provided to the output engine 116, and the output engine 116 can provide the further system utterance 178 to the client device 106 as the system utterance for the next turn of the dialog.

In some implementations or situations, the invocation/interaction module 118 instead generates, based on the candidate values and scores for each slot 177, an agent command with selected value(s) for slot(s) 179. The selected values for the slots that are included in the agent command can be selected based on the scores for those candidate values. The agent command 179 can be transmitted to an agent 140A, which generates responsive content 180. The responsive content 180 can be provided directly to the client device 106 by the agent 140A, or can be provided to the output engine 116, which then provides it (or a conversion thereof) to the client device 106. The agent command 179 can be transmitted to the agent 140A, based on the agent/domain engine 122 selecting the agent (e.g., as indicated by indication 173) and/or based on determining that the agent 140A can generate responsive content for the candidate values determined to represent the current dialog state (e.g., as based on the scores).

In some implementations, the agent command 179 is an invocation request that invokes the agent 140A with the selected values that are selected based on the scores. As described herein, in some situations the automated assistant 110 may still serve as an intermediary after the agent 140A is invoked. As also described herein, in some situations the dialog may be actually transferred to the agent 140A (without the automated assistant 110 serving as an intermediary once transferred), and transferred back to the automated assistant 110 upon occurrence of one or more conditions. Further, as also described herein, in some situations the agent 140A can be executed by the client device 106 and/or brought to the forefront by the client device 106 (e.g., its content can take over a display of the client device 106).

Figure 3:
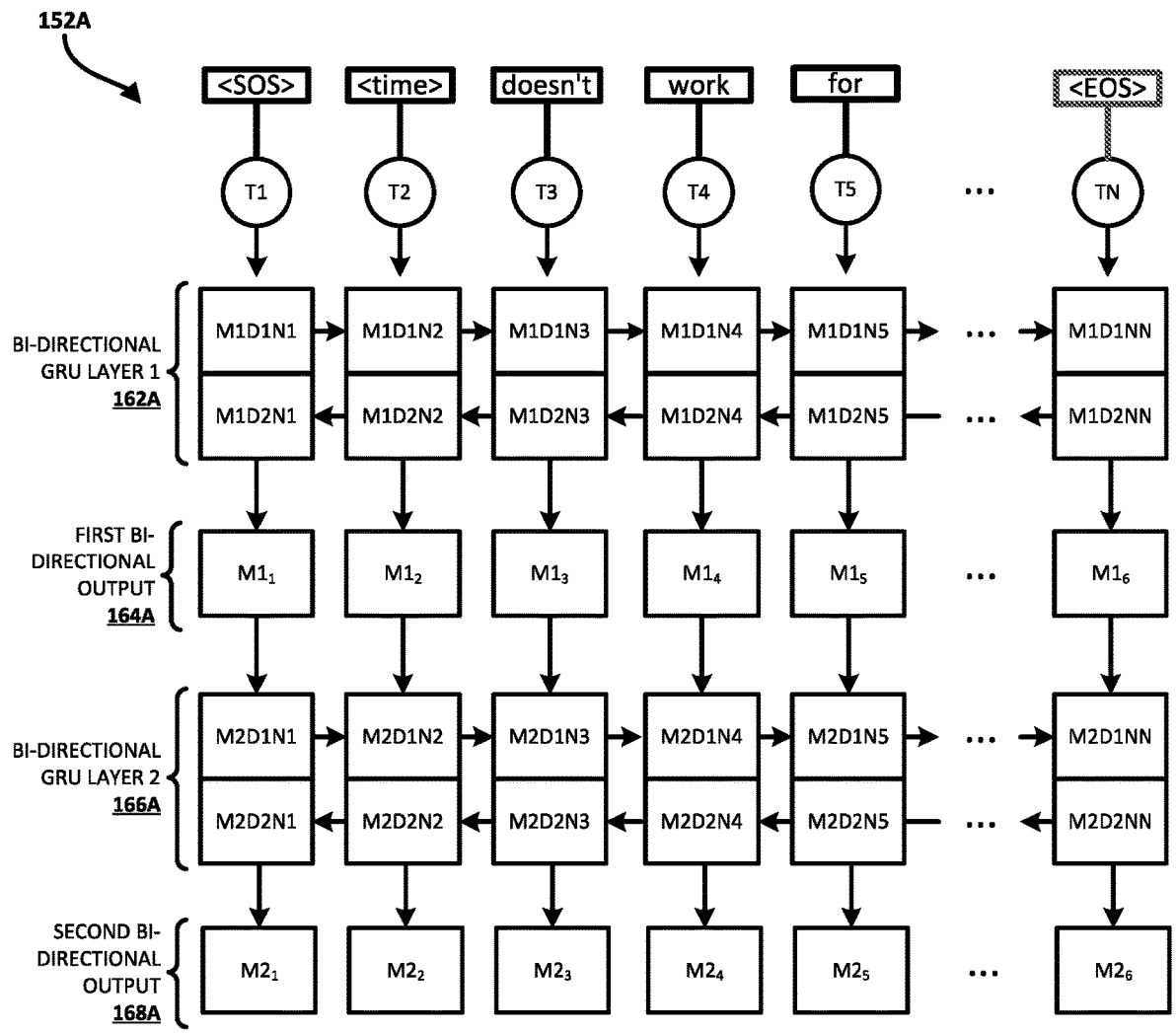
FIG. 3 illustrates an example of a features model that is a bi-directional memory network.

Turning now to FIG. 3, an example of a bi-directional memory network 152A is provided. The bi-directional memory network 152A is a stacked two layer bi-directional memory network, and is one example of the features model 152 (FIGS. 1 and 2A). The bi-directional memory network 152A can be utilized by the features module 134 in generating utterance representations and candidate value features for utilization in generating scores for candidate values. The bi-directional memory network 152A includes a first bi-directional GRU layer 162A, and a second bi-directional GRU layer 166A. In many implementations, the bi-directional memory network 152A can be trained independent of a scoring model (e.g., scoring model 154 or scoring model 154A). As one non-limiting example, the bi-directional memory network 152A can be only an "encoder" portion of an encoder-decoder network that is independently trained to receive tokens as input, generate an encoding of those tokens (as output over the second bi-directional GRU layer 166A) over the "encoder" portion, and then regenerate the tokens over the "decoding" portion. For instance, the bi-directional memory network can be the encoder portion of an encoder-decoder network that is trained on a plurality of training instances that each have a corresponding ordered set of tokens as training instance input, and the same corresponding ordered set of tokens as training instance output.

The first bi-directional GRU layer 162A includes first direction memory units M1D1N1-M1D1NN and second direction memory units M1D2N1-M1D2NN. In the example of FIG. 3, each of the memory units is a GRU memory unit. LSTM memory units and/or other memory units can be utilized in other implementations. The first direction memory units M1D1N1-M1D1NN operate on tokens T1-TN of an utterance in a first direction that conforms to their actual sequence in received natural language input. For example, token T1 is applied as input to M1D1N1. Output generated based on application of token T1 to M1D1N1 is applied to M1D1N2, along with token T2. Output generated based on the application, to M1D1N2, of token T2 and the output from M1D1N1—is applied to M1D1N3, along with token T3. This continues until M1D1NN is reached. It is noted that if the quantity of tokens in the natural language input is less than the quantity of first direction memory units M1D1N1-M1D1NN, "padding" values may be applied as inputs to those first direction memory units M1D1N1-

M1D1NN that are in excess of the quantity of tokens. The "padding" value can be a null value or other value that indicates that no token is present.

The second direction memory units M1D2N1-M1D2NN operate on tokens T1-TN of an utterance in a second direction that is opposite to their actual sequence. For example, token TN is applied as input to M1D2NN. Output generated based on application of token TN to M1D2NN is applied to M1D2NN-1 (unillustrated), along with token TN-1 (also unillustrated). This continues until M1D2N1 is reached. It is noted that if the quantity of tokens in the natural language input is less than the quantity of second direction memory units M1D2N1-M1D2NN, "padding" values may be applied as inputs to those second direction memory units M1D2N1-M1D2NN that are in excess of the quantity of tokens.

First bi-directional output 164A is illustrated in FIG. 3, and represents output generated by first bi-directional GRU layer 162A after processing tokens of an utterance. The first bi-directional output 164A includes outputs $M1_{1-N}$. Each of the outputs $M1_{1-N}$ is output generated based on a corresponding token, and is based on output generated over a corresponding one of the first direction memory units M1D1N1-M1D1NN, as well as output generated over a corresponding one of the second direction memory units M1D1N1-M1D2NN. For example, output M12 can include output from (i.e., the hidden state of) first direction memory unit M1D1N2 and output from (i.e., the hidden state of) second direction memory unit M1D2N2. In this manner, output M12 encodes features of token T2 in the context of the utterance represented by all of the tokens T1-TN, thereby capturing long term dependencies between words of the utterance in the features of token T2.

The second bi-directional GRU layer 166A includes first direction memory units M2D1N1-M2D1NN and second direction memory units M2D2N1-M2D2NN. In the example of FIG. 3, each of the memory units is a GRU memory unit. LSTM memory units and/or other memory units can be utilized in other implementations. The first direction memory units M2D1N1-M2D1NN operate on first portions of first bi-directional output 164A in a first direction, and the second direction memory units M2D2N1-M2D2NN operate on second portions of first bi-directional output 164A in an opposite second direction. For example, the portions of outputs $M1_{1-N}$ that are from the first direction memory units M1D1N1-M1D1NN can be applied to the first direction memory units M2D1N1-M2D1NN of the second bi-directional GRU layer 166A. Further, the portions of outputs $M1_{1-N}$ that are from the second direction memory units M1D2N1-M1D2NN can be applied to the second direction memory units M2D2N1-M2D2NN of the second bi-directional GRU layer 166A.

Second bi-directional output 168A is illustrated in FIG. 3, and represents output generated by second bi-directional GRU layer 166A after processing the first bi-directional output 164A. The second bi-directional output 168A includes outputs $M2_{1-N}$. Each of the outputs $M2_{1-N}$ is output generated based on a corresponding first bi-directional output 164A, and is based on output generated over a corresponding one of the first direction memory units M2D1N1-M2D1NN, as well as output generated over a corresponding one of the second direction memory units M2D1N1-M2D2NN. For example, output $M2_2$ can include output from first direction memory unit M2D1N2 and output from second direction memory unit M2D2N2. In this manner, output $M2_2$ encodes further features of token T2 in the context of all of the first bi-directional outputs 164A, thereby capturing long term dependencies in the features of token T2.

An example is now provided of generating an utterance representation of a turn of a dialog using the bi-directional memory network 152A of FIG. 3. To generate the utterance representation, a user utterance of the turn can be processed over the bi-directional memory network 152A to generate a user utterance representation that is a concatenation of the final forward state and the final backward state of the bi-directional memory network 152A after processing of the user utterance. The final forward state can be the portion of the second bi-directional output $M2_6$ that is generated by the first direction node M2D1NN of second bi-directional GRU layer 166A. That portion of the second bi-directional output $M2_6$ is generated over the first direction node M2D1NN based on processing, by the first direction node M2D1NN, of output generated over the first direction node M1D1NN of first bi-directional GRU layer 162A—and processing of output generated over the first direction node M2D2NN-1 (unillustrated) of second bi-directional GRU layer 166A. The final backward state can be the portion of the second bi-directional output $M2_1$ that is generated by the second direction node M2D2N1 of second bi-directional GRU layer 166A. That portion of the second bi-directional output $M2_1$ is generated over the second direction node M2D2N1 based on processing, by the second direction node M2D2N1, of output generated over the second direction node M1D2N1 of first bi-directional GRU layer 162A—and processing of output generated over the second direction node M2D2N2 of second bi-directional GRU layer 166A.

To generate the utterance representation, a system utterance of the turn can also be processed over the bi-directional memory network 152A to generate a system utterance representation that is a concatenation of the final forward state and the final backward state of the bi-directional memory network 152A after processing of the system utterance. The final forward state can be the portion of the second bi-directional output $M2_6$ that is generated by the first direction node M2D1NN of second bi-directional GRU layer 166A. The final backward state can be the portion of the second bi-directional output $M2_1$ that is generated by the second direction node M2D2N1 of second bi-directional GRU layer 166A.

The utterance representation can be based on a direct sum of the user utterance representation, and the system utterance representation. In some implementations, a system utterance and/or a user utterance can be ignored in determining the utterance representation, if the corresponding utterance lacks any slot or value arguments (e.g., the slot values engine 124 didn't determine any candidate value based on the corresponding utterance). More formally, the utterance representation can be defined as $r_{utt}{}^t = c^t \oplus a_u{}^t \oplus c't \oplus a'_u{}^t$, where $c^t$ is the system utterance representation obtained by concatenating the final forward and backward states of the bi-directional memory network 152A after processing of the system utterance, $a_u{}^t$ is binary vector denoting the presence of system dialog acts which don't have any slot or value argument, and $c'^t$ and $a'_u{}^t$ denote the corresponding features for the user utterance.

An example is now provided of generating candidate value features for a candidate value "6 pm" of a slot "time". An example user utterance is illustrated in FIG. 3, where the example user utterance is the working example of "6 pm doesn't work for me. How about 7 pm?". A delexcalized version of the user utterance is applied on a token-by-token basis to the bi-directional memory network 152A, and includes a special start of sentence (SOS) token as token T1, and a special end of sentence (EOS) token as token TN. The candidate value "6 pm" is delexacalized in FIG. 3 through the replacement of "6 pm" with the slot descriptor "<time>" as token T2. The slot descriptor "<time>" describes the slot for which "6 pm" is a candidate value. "7 pm" can similarly be delexacalized and the slot descriptor "<time>" utilized as the token for "7 pm". However, this is not explicitly illustrated in FIG. 3 as it corresponds to tokens indicated by the ellipsis between tokens T5 and TN, which will be applied to additional memory units of first bi-directional GRU layer 162A that are also indicated by the ellipses between memory units of first bi-directional GRU layer 162A.

The candidate value features for the candidate value of "6 pm" can be based on hidden states of nodes that correspond to the candidate value "6 pm" after processing utterance(s) of the dialog turn that include the candidate value. For example, the candidate value features for the candidate value of "6 pm" can be based on hidden states of nodes M1D1N2, M1D2N2, M2D1N2, and M2D2N2 after processing the example user utterance illustrated in FIG. 3. In FIG. 3, these hidden states are represented as first bi-directional output $M1_2$ (hidden states of nodes M1D1N2 and M1D2N2) and second bi-directional output $M2_2$ (hidden states of nodes M2D1N2 and M2D2N2). Where the candidate value is also included in the system utterance, the candidate value features can further be based on hidden states of nodes that correspond to the candidate value "6 pm" after processing the system utterance. For example, and continuing with the working example, if a system utterance of the turn was "There are tables available at 6 pm at Cascal. Does that work?", the hidden states of nodes corresponding to "6 pm" in the system utterance can further be utilized, after processing of a delexacilized version of the system utterance. More formally, for a candidate $\hat{c}=c_{s,i}^t$ of a slot s, the candidate value features can be defined as $r_{cand}^t(\hat{c})=a_c^t(\hat{c}) \oplus a'_c{}^t(\hat{c}) \oplus p_{\hat{c}}^{t-1} \oplus \Sigma_{k \in T} h_k^t \oplus \Sigma_{k \in T'} h'_k{}^t$, where: $a_c^t(\hat{c})$ is a binary vector denoting the presence of all system dialog acts associated to the candidate value ĉ (e.g., the act inform corresponds to the candidate with value "cheap" for the slot price in the system intent inform(price="cheap")); $p_{\hat{c}}^{t-1}$ is the predicted score of the candidate in the previous turn or 0 if ĉ was not present in $C_s^{t-1}$; T is the set of indices in the delexicalized system utterance at which the candidate value was present prior to delexicalization; and $h_k^t$, k ∈T, are the hidden state vectors obtained from the bi-directional memory network and encode the context in the utterance for the candidate value ĉ. If ĉ is not present in the system utterance, T is empty and the result of the summation is taken to be a zero vector of the appropriate size. $a'_c{}^t(\hat{c})$, T' and $h'_k{}^t$ are the corresponding candidate values for the user utterance.

As described herein, slot features can also be generated at each turn of a dialog for each slot under consideration. The slot features for a slot s can be defined as $r_{slot}^t(s)=a_s^t(s) \oplus a'_s{}^t(s) \oplus p_{\delta_s}^{t-1} \oplus p_{\emptyset_s}^{t-1}$, where $p_{\delta_s}^{t-1} p_{\emptyset_s}^{t-1}$ are the scores of the special values "indifferent" and "null" respectively in the previous turn's output, and $a_s^t(s)$ is a binary vector denoting the presence of system dialog acts having slot s as the argument, (e.g., request(s), deny(s)). $a'_s{}^t(s)$ is the corresponding binary vector for user dialog acts.

Although a particular example of a features model is illustrated in FIG. 3, it is understood that different features models may be utilized, such as different bi-directional memory networks. For example, bi-directional memory networks that include LSTM units can instead be utilized. Also, for example, a bi-directional memory network that includes only a single bi-directional memory layer can instead be utilized (e.g., second bi-directional GRU layer 166A omitted, and features instead derived based on first bi-directional output 164A without also being based on second bi-directional output 168A). As yet another example, a bi-directional memory network that includes more than two bi-directional memory layers can instead be utilized.

Figure 4:
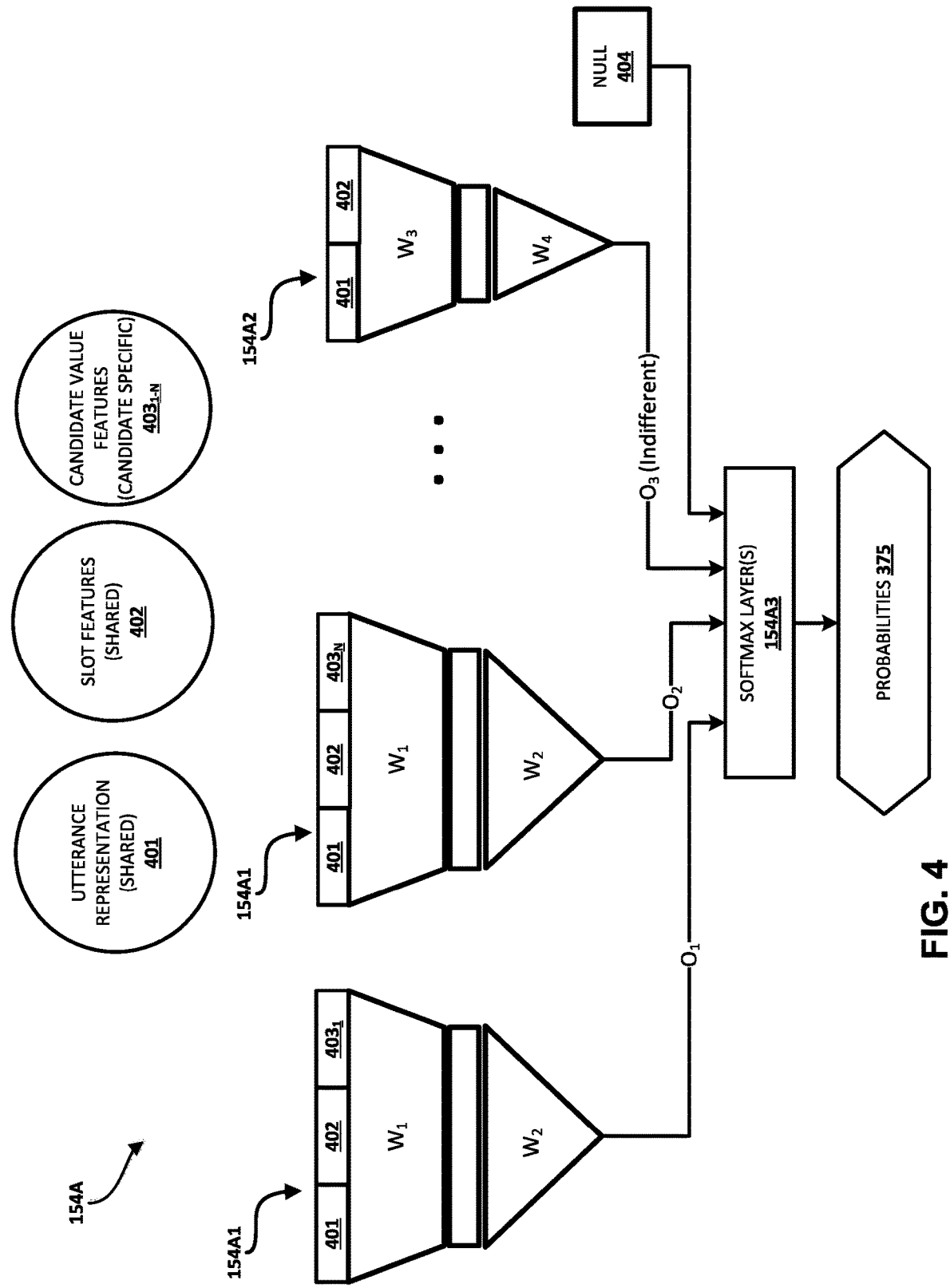
FIG. 4 illustrates an example of a scoring model.

Turning now to FIG. 4, an example of a scoring model 154A is provided. The scoring model 154A is one example of the scoring model 154 (FIGS. 1 and 2A), and can be utilized by the scoring module 136 in generating scores for candidate values. In FIG. 4, the scoring model 154A includes multiple replicates of a trained candidate value scoring model 154A1, includes a trained indifferent scoring model 154A2, and includes one or more softmax layers 154A3. In some implementations, the candidate value scoring model 154A1 can be a trained neural network model (e.g., a feedforward model), where trained weights ($W_1$ and $W_2$) of the model 154A1 represent trained weights of various nodes of the trained neural network model. Also, in some implementations the trained indifferent scoring model 154A2 can be a trained neural network model (e.g., a feedforward model), where trained weights ($W_3$ and $W_4$) of the model 154A2 represent trained weights of various nodes of the trained neural network model. An example of training such models is described in more detail below with respect to FIG. 6.

FIG. 4 illustrates an example where the scoring model 154A is being utilized to score, for a slot, a plurality of candidate values, and an indifferent and null value. In FIG. 4, an utterance representation 401 is provided that is an utterance representation of the user and system utterance of a current dialog turn of the dialog. Slot features 402 are also illustrated, and are slot features of the current dialog turn. Candidate value features $403_{1-N}$ are further illustrated and are candidate value feature of the current dialog turn. As described herein, each of the candidate value features $403_{1-N}$ is specific to a corresponding candidate value being scored. For example, candidate value features $403_1$ can be specific to a candidate value of "6 pm", candidate value features $403_2$ can be specific to a candidate value of "7 pm", etc.

In FIG. 4, the utterance representation 401, the slot features 402, and the candidate value features $403_1$ for a first candidate value are applied as inputs to the candidate value scoring model 154A1. The applied inputs are processed using learned weights $W_1$ and $W_2$ of the candidate value scoring model 154A1 to generate output $O_1$. Further, the utterance representation 401, the slot features 402, and the candidate value features $403_2$ for a second candidate value are applied as inputs to the candidate value scoring model 154A1. They can be applied to the same candidate value scoring model (i.e., after generating the output $O_1$) or to a replicate thereof. The applied inputs are processed using learned weights $W_1$ and $W_2$ of the candidate value scoring model 154A1 to generate output $O_2$. As indicated by the ellipsis, additional outputs can be generated for additional candidate values by applying, to the candidate value scoring model 154A1, the utterance representation 401, the slot features 402, and a corresponding one of the candidate value features $403_{3-N}$.

In FIG. 4, the utterance representation 401 and the slot features 402 are applied as inputs to the indifferent scoring model 154A2 (without application of any candidate value features). The applied inputs are processed using learned weights $W_3$ and $W_4$ of the indifferent scoring model 154A2 to generate output $O_3$.

The outputs $O_1$, $O_2$, $O_3$ (and any other outputs generated over the candidate value scoring model 154A1) are applied as input to softmax layer(s) 154A3, along with a null value 404. In some implementations, the null value 404 can be a first value (e.g., "1") if no candidate values have yet been identified for the slot based on the dialog, and a second value (e.g., "0") otherwise. Each of the inputs applied as input to the softmax layer(s) 154A3 (e.g., outputs $O_1$, $O_2$, $O_3$, and null value 404) can be a logit. The inputs are processed over the softmax layer(s) 154A3 to generate probabilities 375. For example, the probabilities 375 can be normalized probabilities for each of the inputs applied to the softmax layers, thereby providing a corresponding probability for each of the candidate values and for the indifferent and the null values. For example, a first probability can correspond to the output $O_1$ and, as a result, be the probability of the candidate value associated with candidate value features $403i$. Also, for example, a second probability can correspond to the output $O_2$ and, as a result, be the probability of the candidate value associated with candidate value features $403_2$. Also, for example, a third probability can correspond to the output $O_3$ and, as a result, be the probability of the indifferent value. Also, for example, a fourth probability can correspond to the null value 404 and, as a result, be the probability of the null value. Although softmax normalization via softmax layer(s) 154A3 is illustrated, other normalizations can be utilized in other implementations. For example, each of the logits can be normalized separately for each of the candidate values and optionally for the indifferent and/or the null values. This can enable, for instance, specification (e.g., by a user) of multiple candidates for a slot.

It is noted that in generating outputs $O_1$, $O_2$, and optionally additional outputs over the candidate values scoring model 154A1, the same utterance representation 401 and slot features 402 are applied, while only the candidate value features $403_{1-N}$ that are applied differs. Moreover, the same candidate values scoring model 154A1 can be utilized (or a replicate thereof) in generating outputs $O_1$, $O_2$, and optionally additional outputs over the candidate values scoring model 154A1. Use of the same candidate values scoring model 154A1 (or a replicate thereof) and/or use of the same utterance representation and slot features in generating scores for multiple candidate values can result in computational efficiencies. Moreover, in many implementations, in generating scores for candidate values of additional slots, the same candidate values scoring model 154A1 can be used for those additional slots, and the same utterance representation 401 can be applied as input. This can also result in computational efficiencies.

Figure 5:
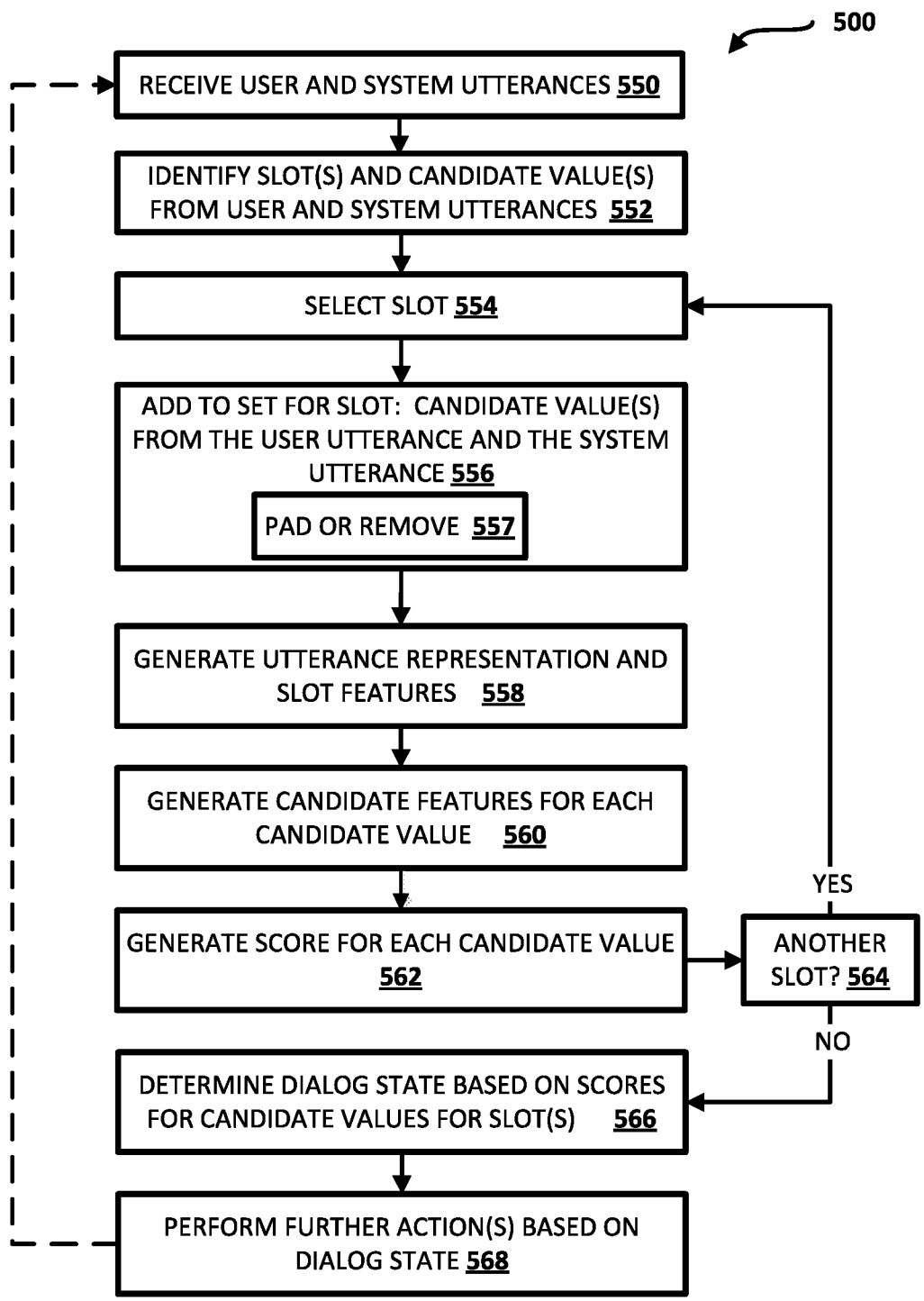
FIG. 5 is a flowchart illustrating an example method of determining dialog states during a dialog and performing further action(s) based on the dialog state(s), according to implementations disclosed herein.

FIG. 5 is a flowchart illustrating an example method 500 of determining dialog states during a dialog and performing further action(s) based on the dialog state(s), according to implementations disclosed herein. For convenience, the operations of the flow chart of FIG. 5 are described with reference to a system that performs the operations. This system may include various components of various computer systems, such as one or more components of automated assistant 110. Moreover, while operations of method 500 are shown in a particular order, this is not meant to be limiting. One or more operations may be reordered, omitted or added.

At block 550, the system receives a user utterance and a system utterance. The user utterance and the system utterance are utterances of a dialog turn of an electronic dialog that includes the system and a user.

At block 552, the system identifies slot(s) and candidate value(s) from the user and system utterances. For example, the system can identify the slot(s) and candidate value(s) from a slot values engine that utilizes a LU model to identify the slot(s) and the candidate value(s). In some implementations, the system also identifies slot descriptors for the slot(s).

At block 554, the system selects a slot.

At block 556, the system adds, to a candidate set for the slot: one or more of the identified candidate value(s) from the user and system utterances. For example, the system can add one of the identified candidate values to the set for the slot, if the candidate value is for the slot and if the candidate value is not already included in the set.

At optional block 557, the system can pad the set, or remove existing candidate values from the set. For example, the system can pad the set with "padding" values if less than K candidate values are included in the set after adding any identified candidate values to the set. Also, for example, the system can remove one or more existing candidate values from the set, before adding the identified candidate values, if adding the candidate values would result in greater than K candidate values being included in the set. The system can remove the existing candidate value(s) based on scores, from an immediately preceding dialog turn, for those candidate value(s).

At block 558, the system generates an utterance representation based on the received user and system utterances. At block 558, the system also generates slot features for the selected slot.

At block 560, the system generates candidate value features for each of the candidate values of the candidate set. As described herein, in generating the utterance representation and the candidate value features, the system can generate the utterance representation and the candidate value features based on processing of delexecalized versions of the system utterance and the user utterance using a bi-directional memory network.

At block 562, the system generates a score for each of the candidate values of the candidate set. The system can generate the score for each of the candidate values using the utterance representation, the slot features for the slot, and the candidate value feature for the candidate value. In some implementations, the system also generates a score for an indifferent value for the slot, and a score for a null value for the slot. The generated scores can be normalized probabilities.

At block 564, the system determines whether there is another slot to process. If so, the system proceeds back to block 554 and selects another slot. The system then proceeds to blocks 556, 557, 558, 560, and 562 for the selected slot. It is noted that in many implementations, the utterance representation will not be generated again in subsequent iterations of block 558, since the utterance representation can be used in generating scores for all slots and for all candidate values. It is also noted that, although shown serially in FIG. 5, in many implementations, multiple iterations of blocks 556, 557, 558, 560, and 562 may occur in parallel, each for a different slot.

If the system determines at an iteration of block 564 that all slots have been processed, the system proceeds to block 566.

At block 566, the system determines the dialog state based on the generated scores for candidate values for one or more slots.

At block 568, the system performs one or more further actions based on the determined dialog state.

If the dialog continues (e.g., the one or more further actions include generating a next system utterance based on the dialog state, and providing the system utterance in the next turn of the dialog), the system can proceed back to block 550 and receive an additional user utterance and an additional system utterance of the next turn of the dialog. Additional blocks of FIG. 5 can then be performed based on the additional user and system utterances, and an updated dialog state determined at block 566 based on updated scores generated based on the additional user and system utterances. This can continue through multiple turns of the dialog.

Figure 6:
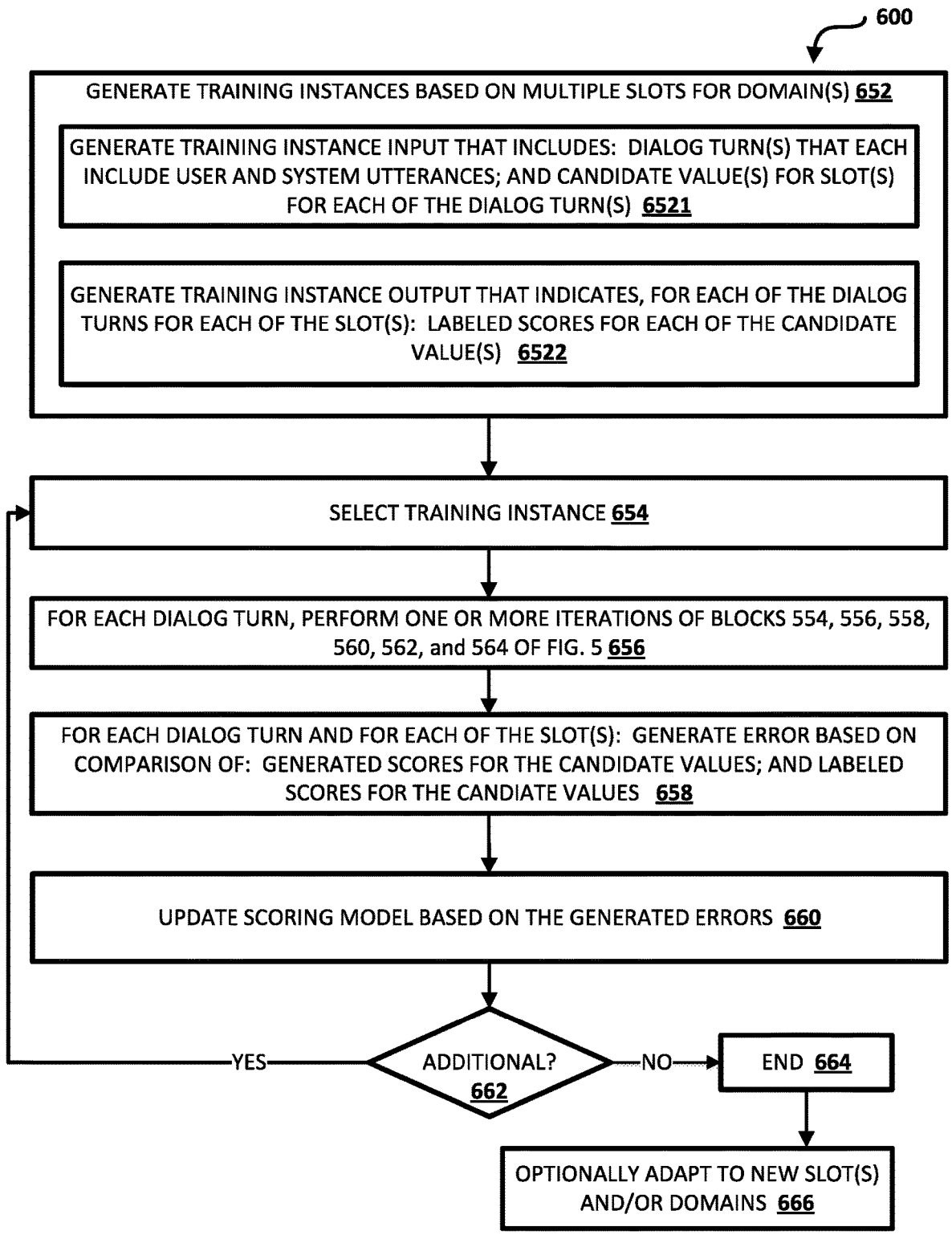
FIG. 6 is a flowchart illustrating an example method of training a scoring model, according to implementations disclosed herein.

FIG. 6 is a flowchart illustrating an example method 600 of training a scoring model, according to implementations disclosed herein. For convenience, the operations of the flow chart of FIG. 6 are described with reference to a system that performs the operations. This system may include various components of various computer systems, such as one or more GPU(s), CPU(s), and/or TPU(s). Moreover, while operations of method 600 are shown in a particular order, this is not meant to be limiting. One or more operations may be reordered, omitted or added.

At block 652, the system generates training instances based on multiple slots for one or more domains. Block 652 can include multiple iterations of blocks 6521 and 6522, where each iteration is performed to generate a corresponding training instance.

At block 6521, the system generates training instance input of a training instance. The training instance input includes: one or more dialog turns that each include user and system utterances; and one or more candidate values for slots for each of the dialog turns.

At block 6522, the system generates training instance output of the training instance. The training instance output indicates, for each of the dialog turns and for each of the slots: labeled scores for each of the candidate values of the training instance input.

As one example of a particular training instance, the training instance input can include a dialog turn that includes a system utterance of "There are tables available at 6 pm at Cascal. Does that work?" and a user utterance of "6 pm doesn't work for me. How about 7 pm?". The training instance input can further include, for the dialog turn, candidate values of "6 pm" and "7 pm" for a "time" slot, and candidate values of "Cascal" for a "restaurant name" slot. In other implementations, the candidate values may be omitted from the training instance input, and instead determined by a slot values engine during training. The training instance input can further include descriptors of the "time" and "restaurant name" slots. The training instance output can include, for the "time" slot for the dialog turn, a probability of "1.0" for the candidate value "6 pm", a probability of "0.0" for the candidate value of "7 pm", and probabilities of "0.0" for the null and indifferent values for the "time" slot. The training instance output can further include, for the "restaurant name" slot for the dialog turn, a probability of "1.0" for the candidate value of "Cascal", and probabilities of "0.0" for the null and indifferent values for the "restaurant name" slot. The training instance output can further include, for other slots for the dialog turn, a "1.0" value for the null value, and "0.0" values for the indifferent value.

At block 654, the system selects a training instance.

At block 656, the system performs, for each dialog turn of the training instance, one or more iterations of blocks 554, 556, 557, 558, 560, 562, and 564 of FIG. 5. In particular, the system performs those blocks to generate "predicted" scores at each dialog turn utilizing the system utterance and the user utterance of the dialog turn, and the current version of the scoring model.

At block 658, for each dialog turn and for each of the slots of the training instance, the system generates an error based on comparison of: the generated scores for the candidate values (generated in an iteration of block 556 of FIG. 5); and the labeled scores for the candidate values (from the training instance output). For example, and continuing with the example above, assume predicted scores are generated for the "time" slot of: "0.7" for the candidate value "6 pm", "0.3" for the candidate value of "7 pm", and "0.0" for the null and indifferent values for the "time" slot. An error can be determined based on the different between those predictions and the labeled scores of "1.0" for "6 pm", "0.0" for "7 pm", and f "0.0" for the null and indifferent values for the "time" slot.

At block 660, the system updates the scoring model based on the generated errors. For example, the system can backpropagate the errors over the scoring model to update weights of the scoring model. Various errors and bakpropagation techniques can be utilized. For instance, the same candidate value scoring models and indifferent scoring model can be utilized in generating scores for each of the slots of a dialog turn, an error determined for each of the slots, and the accumulated errors for each of the slots of the dialog turn backpropagated over the candidate value scoring models and indifferent scoring model after each dialog turn. It is noted that in many implementations, the features model will not be updated based on the errors. For example, the features model can be trained separately prior to training of the scoring model. The features model can be utilized in generating predicted values during training of the scoring model, but the features model can remain fixed during training of the scoring model—while the parameters of the scoring model are updated.

At block 662, the system determines whether to process an additional training instance. If so, the system proceeds to block 654, selects an additional training instance, then performs blocks 656, 658, and 660 based on the additional unprocessed training instance. In some implementations, at block 662 the system may determine not to process any additional unprocessed training instances if one or more training criteria have been satisfied (e.g., a threshold number of epochs have occurred and/or a threshold duration of training has occurred).

If, at block 662, the system determines not to process an additional training instance, the system proceeds to block 664 and training ends.

In some implementations, the training instances of block 652 include training instances from multiple slots and/or from multiple domains. In some of those implementations, such multi-domain and/or multi-slot training enables the scoring model can be utilized for any of those slots and/or domains—and/or for unseen slots and/or domains (i.e., those not included in the training instances). In some implementations, the system may proceed to block 666 to further train the scoring model for new slot(s) and/or domain(s). For example, additional training instances can be generated that are particularized to a new slot and/or a new domain—and further training of the model can be performed to adapt the model to the new slot and/or domain. In many implementations, where training instances of block 652 include training instances from multiple slots and/or from multiple domains, the adaptation of the scoring model to a new slot and/or domain can occur via less training than if multi-domain and/or multi-slot training were not utilized.

Figure 7:
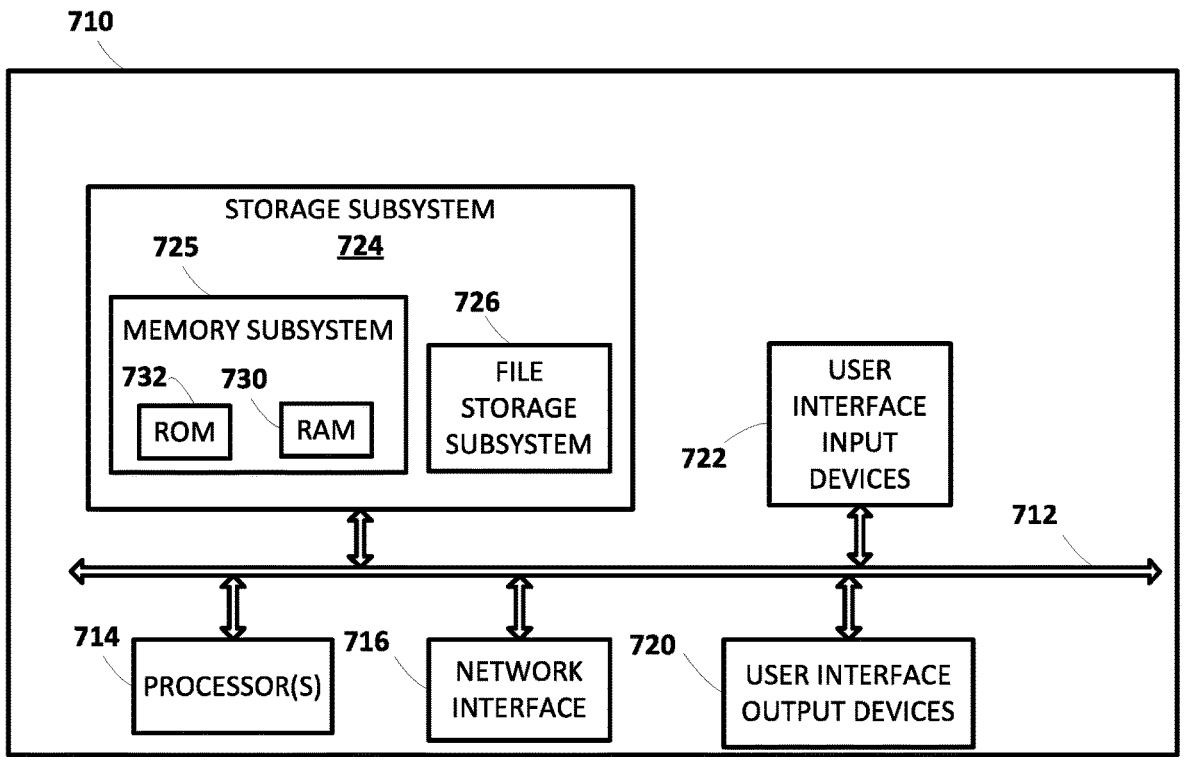
FIG. 7 illustrates an example architecture of a computing device.

FIG. 7 is a block diagram of an example computing device 710 that may optionally be utilized to perform one or more aspects of techniques described herein. In some implementations, one or more of client device 106, automated assistant 110, an agent, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method(s) of FIG. 5 and/or FIG. 6.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

The invention claimed is:

1. A method implemented by one or more processors, comprising:
identifying a system utterance of an automated assistant, and a user utterance of a user, the system utterance and the user utterance provided during a turn of an electronic dialog that includes the user and the automated assistant;
determining, based on the system utterance and the user utterance, one or more candidate values for a slot;
generating:
a system utterance representation for the system utterance, and
system candidate value features for each of the candidate values for the slot,
wherein generating the system utterance representation and the system candidate value features is based on processing of the system utterance using a bi-directional memory network;
generating:
a user utterance representation for the user utterance, and
user candidate value features for each of the candidate values for the slot,
wherein generating the user utterance representation and the user candidate value features is based on processing of the user utterance using the bi-directional memory network;
generating a score for each of the candidate values for the slot, wherein generating the score for each of the candidate values is based on processing, using a trained scoring model: the system utterance representation, the user utterance representation, the system candidate value features for the candidate value, and the user candidate value features for the candidate value;
selecting a given value, of the candidate values for the slot, based on the scores for the candidate values; and
performing a further action based on the selected given value for the slot.

2. The method of claim 1, wherein determining the candidate values for the slot comprises determining the given value based on one or more given terms of the system utterance, and wherein generating the system utterance representation and the system candidate value features based on processing of the system utterance using the bi-directional memory network comprises:
generating a delexicalized system utterance that includes the terms of the system utterance, but that replaces the one or more given terms of the system utterance with a slot descriptor for the slot; and
processing the delexicalized system utterance using the bi-directional memory network.

3. The method of claim 2, wherein generating the system utterance representation comprises:
generating the system utterance representation based on final and/or hidden states of the bi-directional memory network after the processing of the system utterance.

4. The method of claim 1, wherein generating the system candidate value features for the given value comprises:
generating the system candidate value features based on hidden states, of nodes of the bi-directional memory network that correspond to the slot descriptor of the slot, after the processing of the system utterance.

5. The method of claim 1, wherein determining the candidate values for the slot comprises determining the given value based on one or more given terms of the user utterance, and wherein generating the user utterance representation and the user candidate value features based on processing of the user utterance using the bi-directional memory network comprises:
generating a delexicalized user utterance that includes the terms of the user utterance, but that replaces the one or more given terms of the user utterance with a slot descriptor for the slot; and
processing the delexicalized user utterance using the bi-directional memory network.

6. The method of claim 5, wherein generating the user utterance representation comprises:
generating the user utterance representation based on final and/or hidden states of the bi-directional memory network after the processing of the user utterance.

7. The method of claim 5, wherein generating the user candidate value features for the given value comprises:
generating the user candidate value based on hidden states, of nodes of the bi-directional memory network that correspond to the slot descriptor of the slot, after the processing of the user utterance.

8. The method of claim 1,
wherein the one or more candidate values include the given value and an additional value;
wherein generating the score for the given value is based on processing, using the trained scoring model: the system utterance representation, the user utterance representation, the system candidate value features for the given value, and the user candidate value features for the given value; and
wherein generating the score for the additional value is based on processing, using the trained scoring model: the system utterance representation, the user utterance representation, the system candidate value features for the additional value, and the user candidate value features for the additional value.

9. The method of claim 1, wherein the one or more candidate values further comprise an indifferent value, and wherein generating the score for the indifferent value is based on the system utterance representation, the user utterance representation, and a score for the indifferent value in an immediately preceding turn of the electronic dialog.

10. The method of claim 1, further comprising:
generating an overall utterance representation based on a combination of the system utterance representation and the user utterance representation;
generating overall candidate value features for the given value based on a combination of the system candidate value features for the given value and the user candidate value features for the given value;
wherein processing, using the trained scoring model: the system utterance representation, the user utterance representation, the system candidate value features for the given value, and the user candidate value features for the given value comprises:
processing the overall utterance representation and the overall candidate value features using the trained scoring model.

11. The method of claim 10, wherein generating the overall candidate value features for the given value is further based on a previous score for the given value, the previous score determined for the given value based on a prior system utterance and a prior user utterance of a prior turn of the electronic dialog, the prior turn immediately preceding the turn of the electronic dialog.

12. The method of claim 1, wherein each of the scores is a probability.

13. The method of claim 1, further comprising:
identifying an additional system utterance and an additional user utterance of the user, the additional system utterance and the additional user utterance being in a following turn of the electronic dialog, the following turn immediately following the turn of the electronic dialog;
determining, based on the additional system utterance and the additional user utterance, one or more additional candidate values for the slot;
selecting, based on the scores, a subset of the candidate values for scoring based on the additional system utterance and the additional user utterance;
generating additional scores for: each of the additional candidate values for the slot, and each of the candidate values of the subset, wherein generating the additional scores is based on an additional system utterance representation of the additional system utterance and an additional user utterance representation of the additional user utterance;
selecting, based on the scores and from the additional candidate values and the candidate values of the subset, an additional given value for the slot; and
performing a yet further action based on the additional given value for the slot.

14. The method of claim 1, further comprising:
selecting a domain based on the electronic dialog;
selecting the slot based on it being assigned to the domain.

15. The method of claim 1, wherein performing the further action based on the selected given value for the slot comprises:
generating an agent command that includes the selected given value for the slot; and
transmitting the agent command to an agent over one or more networks, wherein the agent command causes the agent to generate responsive content and transmit the responsive content over one or more networks.

16. The method of claim 15, further comprising:
receiving the responsive content generated by the agent; and
transmitting, to a client device at which the user utterance was provided, output that is based on the responsive content generated by the agent.

17. The method of claim 1, wherein performing the further action based on the selected given value for the slot comprises:
generating an additional system utterance based on the selected given value; and
incorporating the additional system utterance in a following turn of the electronic dialog for presentation to the user, the following turn immediately following the turn in the electronic dialog.

18. The method of claim 1, wherein the trained scoring model comprises a trained candidate value scoring model that is a neural network model, and wherein generating the score for the given value comprises:
applying, as input to the trained candidate value scoring model, input that is based on the system utterance representation, the user utterance representation, the system candidate value features for the candidate value, and the user candidate value features for the candidate value;

generating an output based on processing of the input using the trained candidate value scoring model; and generating the score for the given value based on applying the output to an affine layer of the trained candidate value scoring model, along with generated outputs for other of the candidate values of the set.

19. An apparatus, comprising:

memory storing instructions;

one or more processors configured to execute the instructions stored in the memory to perform a method comprising:

identifying a system utterance of an automated assistant, and a user utterance of a user, the system utterance and the user utterance provided during a turn of an electronic dialog that includes the user and the automated assistant;

determining, based on the system utterance and the user utterance, one or more candidate values for a slot;

generating:

a system utterance representation for the system utterance, and system candidate value features for each of the candidate values for the slot, wherein generating the system utterance representation and the system candidate value features is based on processing of the system utterance using a bi-directional memory network;

generating:

a user utterance representation for the user utterance, and user candidate value features for each of the candidate values for the slot, wherein generating the user utterance representation and the user candidate value features is based on processing of the user utterance using the bi-directional memory network;

generating a score for each of the candidate values for the slot, wherein generating the score for each of the candidate values is based on processing, using a trained scoring model: the system utterance representation, the user utterance representation, the system candidate value features for the candidate value, and the user candidate value features for the candidate value;

selecting a given value, of the candidate values for the slot, based on the scores for the candidate values; and performing a further action based on the selected given value for the slot.

\* \* \* \* \*